(12) United States Patent
Askeland

(10) Patent No.: US 11,293,761 B2
(45) Date of Patent: Apr. 5, 2022

(54) VERIFICATION AND UPDATING OF MAP DATA

(71) Applicant: Zoox, Inc., Foster City, CA (US)

(72) Inventor: Jacob Lee Askeland, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 16/813,599

(22) Filed: Mar. 9, 2020

(65) Prior Publication Data

US 2020/0208994 A1 Jul. 2, 2020

Related U.S. Application Data

(63) Continuation of application No. 15/336,988, filed on Oct. 28, 2016, now Pat. No. 10,584,971.

(51) Int. Cl.
*G01C 21/30* (2006.01)
*G01C 21/36* (2006.01)

(52) U.S. Cl.
CPC ......... *G01C 21/30* (2013.01); *G01C 21/3676* (2013.01)

(58) Field of Classification Search
CPC ............ G01C 21/30; G01C 21/3676; G01C 21/3438; G01C 21/36; B60W 2550/00; B60W 2550/40; B60W 2550/402; B60W 2550/406; B60W 2550/408; B60W 2750/00; B60W 2750/40; B60W 2540/043; B60W 2556/50; B60W 50/08; G05D 2201/0212; G05D 2201/0276; H04L 63/105; G06F 21/604; B60R 25/241

USPC .................................................... 701/428, 25
See application file for complete search history.

(56) References Cited

U.S. PATENT DOCUMENTS

| 2008/0106436 A1 | 5/2008 | Breed |
| 2009/0080697 A1 | 3/2009 | Kishikawa et al. |
| 2012/0054058 A1 | 3/2012 | Petrelli |

(Continued)

OTHER PUBLICATIONS

Final Office Action dated Sep. 18, 2019 for U.S. Appl. No. 15/336,988 "Verification and Updating of Map Data," Askeland, 8 pages.

(Continued)

*Primary Examiner* — Anthony R Jimenez
(74) *Attorney, Agent, or Firm* — Lee & Hayes, P.C.

(57) ABSTRACT

Systems and methods to provide accurate and timely maps to autonomous vehicles. The system can utilize local map data from a plurality of electronic devices via a data gathering application ("app"). The system can compare local map data to existing global maps to identify differences and update the global maps and/or indicate that the global maps need to be updated. The system can receive camera, GPS, cellular location services, accelerometer, magnetometer, and other sensor data from the plurality of electronic devices. The system can provide incentives to users to drive on routes or proximate areas-of-interest. This can include routes or areas-of-interest that are frequently used by the autonomous vehicles in the system. This can also include routes that include accidents, construction sites, and other differences that can receive more frequent updates. The app can include a user interface (UI) to enable users to provide updates related to certain conditions.

18 Claims, 11 Drawing Sheets

(56) References Cited

U.S. PATENT DOCUMENTS

2012/0323474 A1\* 12/2012 Breed .................. B60W 30/16
                                                  701/117
2016/0214533 A1\*  7/2016 Doyle ................ H04N 1/00244
2016/0221592 A1\*  8/2016 Puttagunta ............. B61L 25/04

OTHER PUBLICATIONS

Office action for U.S. Appl. No. 15/336,988, dated Mar. 6, 2019, Askeland, "Verification and Updating of Map Data," 9 pages.

\* cited by examiner

VERIFICATION AND UPDATING OF MAP DATA

RELATED APPLICATION

This application is a continuation of and claims priority to U.S. patent application Ser. No. 15/336,988, filed on Oct. 28, 2016, the disclosure of which is incorporated by reference herein.

BACKGROUND

Autonomous vehicles can improve the safety and efficiency of transportation systems. Autonomous vehicles rely on microprocessors and sensors to make routing and maneuvering decisions. As a result, in many cases, these vehicles can react more quickly and accurately to changing conditions than a human driver. Thus, autonomous vehicles can travel closer together and at higher speeds, for example, reducing congestion.

Autonomous vehicles can operate purely on sensor data. These vehicles can use data generated or received from, for example, one or more location systems (e.g., global positioning system (GPS) and/or cell tower location systems), proximity sensors, cameras, and/or other sensors to stay in a particular lane, for example, stop for red lights, avoid other vehicles and pedestrians, locate addresses and landmarks (e.g., bridges, building, etc.), and to safely travel from one location to another. This process is improved and processor load is reduced, however, by providing the vehicle with an accurate map. The map can be a 2-D or 3-D map of the area of operation of the vehicle.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
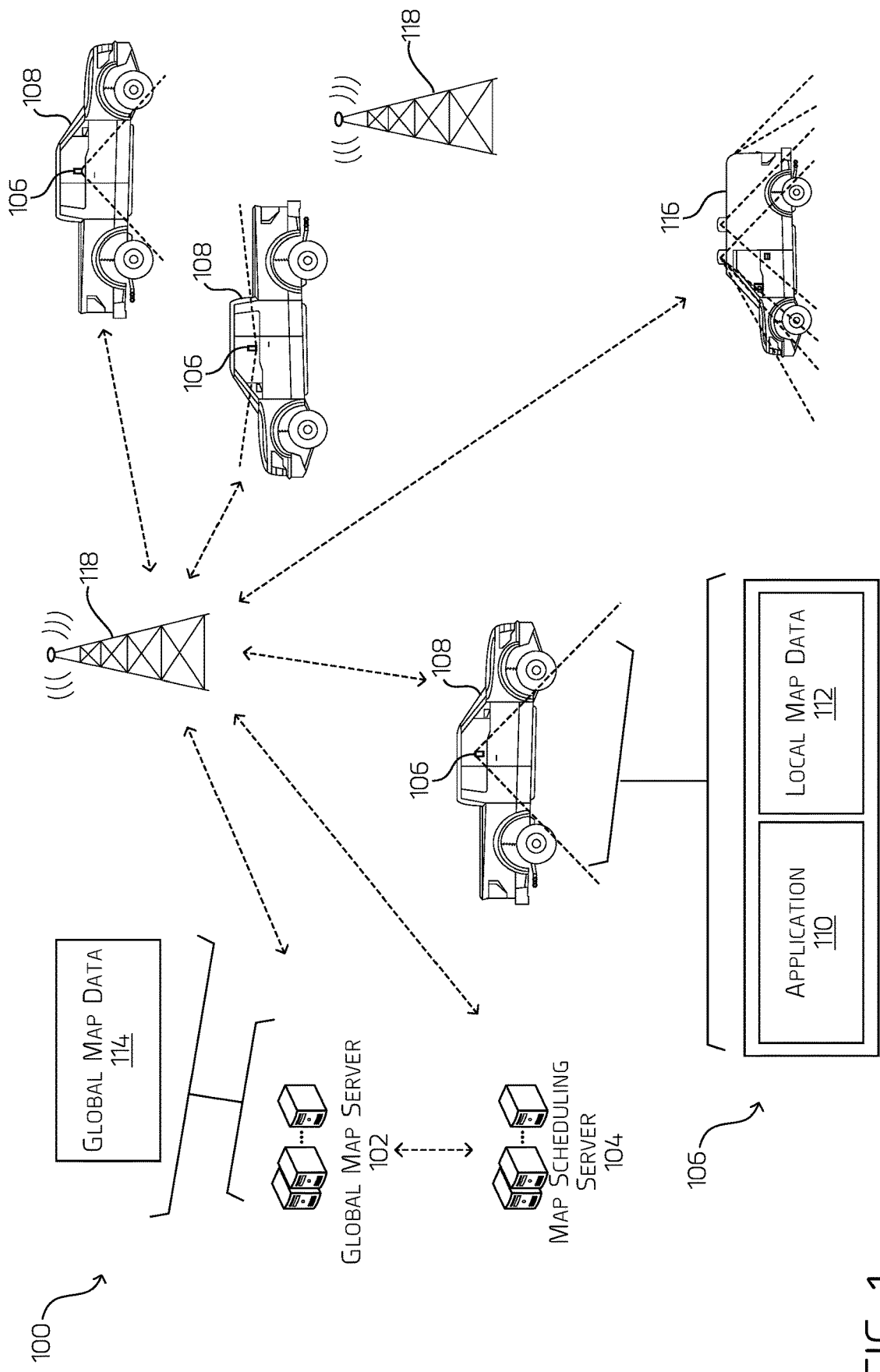
FIG. 1 is a schematic diagram of a system to verify and update global map data, in accordance with some examples of the present disclosure.

As discussed above, maneuvering and navigating autonomous vehicles by relying solely on sensor data requires significant bandwidth and processor power, among other things. Receiving data from proximity sensors, video cameras, and other sensors, processing the data, formulating an appropriate response, and taking action generally must be done in real-time (or nearly real-time), which requires fast communications busses and fast processors, among other things. Some demand can be removed from this process, however, by using accurate mapping data.

Obtaining and maintaining accurate mapping data can, in itself, be an intensive process. High-resolution 2-D, 2.5-D, or 3-D maps can require specialized mapping vehicles with expensive, data intensive equipment, among other things. In addition, changing conditions (e.g., construction, traffic, accidents, etc.) can quickly render maps, or portions of maps, obsolete. Regularly remapping entire areas included in these maps, however, may be logistically impractical and expensive.

To this end, examples of the present disclosure are related to systems and methods for maintaining and updating high-resolution global maps. The system can utilize local map data gathered from a plurality of electronic devices via an application ("app") or other component on the electronic devices to provide "crowd sourced" map updates. The local map data can be compared to existing "global" maps—i.e., maps created by specialized mapping vehicles with high-resolution mapping sensors—to indicate when remapping by these mapping vehicles is desired. In some examples, the crowd sourced local map data can be used to update the global maps directly. The system can use photo, video, GPS, cellular location services, and other data from the electronic devices to detect differences between the global map and local map data. If differences between the local map data and the global maps are confirmed, the global map can be updated to include the local map data, or the global map can be remapped using the mapping vehicles and/or data from one or more electronic devices.

As used herein, the term "global map" or "global map data" relates to map data compiled and/or updated by the mapping vehicles or, in some cases, multiple electronic devices, and covering large areas (e.g., city blocks, cities, counties, regions, etc.). The mapping vehicles can be specialized vehicles that include a plurality of high-resolution sensors capable of rendering high-resolution 2-D, 2.5-D, or 3-D maps for use by various technologies, including autonomous vehicles. As discussed below, the mapping vehicle can include, for example, a suite of proximity sensors, navigation sensors, and cameras to provide high-resolution, highly accurate global maps. When compared to the local map data from typical electronic devices (e.g., vehicle navigation systems or cell phones), for example, the global map data from the mapping vehicle can be significantly higher resolution and significantly more accurate. In some examples, one or more of the aforementioned autonomous vehicles can comprise high-resolution mapping equipment and act as mapping vehicles. Additionally or alternatively, sensor data from one or more of the automated vehicles can be used to supplement, or replace, sensor data from the specialized mapping vehicles. Due to the volume of data obtained by the mapping vehicle and the cost of the mapping vehicle itself, however, the global mapping and remapping process can be slow and expensive.

As used herein, the term "local map" or "local map data" relates to a map, or data structure, generated relative to an electronic device. A local map can be a map generated relative to a an arbitrary origin—e.g., in this case, the capture device such as a cellular phone—based on data received from one or more electronic devices and related to a relatively small area (e.g., within the viewing area of a cell phone camera or the range of a radar, LIDAR, or other sensor) proximate the electronic device. Local map data can include raw sensor data such as, for example, image data from one or more cameras on the electronic device, data from one or more object detection systems (e.g., LIDAR, radar, sonar, etc.), GPS data, and cellular location services data. Local map data can also include, for example, data from one or more accelerometers, gyros, magnetometers, inertial measurement units (IMUs), or other components of the electronic device. In some examples, local map data can also include feature sets (e.g., feature vectors) from sensor data from the one or more electronic devices associated with a global or local coordinate system.

In other examples, local map data can also include a local map constructed from data from multiple sensors on the one or more electronic devices and fused into local map data. In other words, rather than simply sending raw sensor data from, for example, a camera and a GPS receiver of an electronic device, raw data can be combined into 2-D, 2.5D, or 3-D local map data, which may include image data from one or more cameras, location data, feature identification, a timestamp, and other sensor data fused into a single map. In this manner, the local map data may be directly (or more directly) compared to relevant portions of the global map, for example.

As used herein, the term "map data" means data related to the creation, updating, and/or presentation of information on or in connection with a map. By way of example and not limitation, map data includes topologic maps, street maps, rail maps, weather maps, GPS data, satellite images, geographic information, street-view images, coordinates, points of interest, addresses, construction information, accident information, traffic information, route information, driving directions, and electronic device data (e.g., location, rate of travel, acceleration, route, destination, images, video, etc.). Indeed, map data can include any user defined map structure (e.g. a representation of features and coordinates, images, surfaces, voxels, etc.).

By way of example and not limitation, the term "electronic device," as used herein, includes mobile devices (e.g., smart phones, tablets, laptop computers, GPS devices, etc.), vehicle-based computers (e.g., navigation systems, control systems, entertainment systems, sensor systems, dash cameras, camera arrays, etc.), or other devices capable of collecting and/or relaying map data, sensor data, or other data for comparison to, and/or updating of, global map data. The electronic devices 106 can include components such as, for example, cameras, accelerometers, GPS receivers, cellular and wireless transceivers, magnetometers, altimeters, compasses, gyroscopes, and other equipment, which can be used to compile and send data. The electronic device can also include one or more cameras including, but not limited to, low- and high-resolution digital still and video cameras, stereoscopic cameras—which may be capable of providing ranging information—and vehicle camera arrays (e.g., parking cameras) with multiple views.

While techniques are described below in the context of passenger vehicles (e.g., personal vehicles such as cars and trucks; for hire vehicles such as taxis and shuttles; and public vehicles such as busses, passenger trains, boats, etc., the techniques are also applicable to non-passenger vehicles (e.g., freight trucks, delivery trucks, semi-trucks, freight trains, agricultural equipment, etc.). Also, while described in the context of ground vehicles, techniques according to this application are also applicable to aerial and marine vehicles. Still further, while techniques are described in the context of autonomous vehicles capable of transportation with limited or no active human control, the techniques are also applicable in other contexts, such as manually operated (i.e., non-autonomous) vehicles, bicyclists, pedestrians, or non-transportation uses of map data.

The systems, methods, and devices described hereinafter as making up the various elements of the present disclosure are intended to be illustrative and not restrictive. Many suitable systems, methods, and configurations that would perform the same or a similar function as the systems described herein, are intended to be included within the scope of the disclosure.

As mentioned above, autonomous vehicles can operate based on data from sensors on the vehicles. These vehicles can use high-resolution video cameras, for example, to detect lane markings, landmarks, addresses, and other visual features. In some examples, features can also represent unique pixels, or groups of pixels, in images, LIDAR or radar signatures, for example, associated with a local coordinate system or other parameters for comparison to global map data associated with an overlapping global coordinate system. These vehicles can also use proximity sensors to detect obstacles and other vehicles, among other things. Due to discontinuities in real world driving, however, relying solely on onboard sensors can be unreliable and, at the least, requires a great deal of processing power. Lane markings stop and start at the exits and entrances to highways, for example, which can confuse sensor-based guidance systems. Other vehicles on the road can maneuver in unexpected ways in response to emergencies, debris in the road, vehicle malfunctions (e.g., flat tires), etc. There can also be myriad unexpected changes along routes such as, for example, construction and traffic.

To this end, it can be useful to have high-resolution 2-D or 3-D maps for use with autonomous vehicles to remove some of the burden of navigation. This can enable more of the available processor power and sensor data to be used for duties other than navigation (e.g., collision and object avoidance, ride comfort, etc.). The maps, or global maps, can begin with information from very accurate maps, for example, and then be supplemented with empirical data. In some examples, the global maps can be created using specially outfitted mapping vehicles. These mapping vehicles can include multiple sensors including, but not limited to, cameras, radar, light detection and ranging (LIDAR), GPS, cellular navigation services, and microphones to gather very accurate map data. Additionally or alternatively, aerial and/or satellite imagery may be used to generate and/or supplement these maps. Examples of such technologies are described in U.S. patent application Ser. No. 14/932,963, filed Nov. 4, 2015, entitled, "Adaptive Mapping to Navigate Autonomous Vehicles Responsive to Physical Environmental Changes" ("the '963 Application"), which is hereby incorporated by reference as if fully set forth below. In some cases, the high-resolution data provided by these global maps can improve vehicle positioning accuracy from the 2 meters commonly provided by GPS systems to approximately 1 centimeter.

Regardless of how these maps are created, however, it is necessary to update the maps periodically to maintain their accuracy and to ensure proper functioning of the autonomous vehicles, among other things. Updating the maps can include both temporary and permanent changes to particular areas of the map. If a new turning lane is created on an existing route, for example, the map can be permanently updated to include this information. If a temporary lane closure due to construction is identified, on the other hand, then the map can be temporarily updated to include the closure. The lane closure can then be removed when appropriate.

As used herein, map data refers broadly to data in any structure or format which provides an association between features and positions. As mentioned above, this can include, for example, images, or pixels of an image, LIDAR or radar signatures, features associated with a particular coordinate reference (or other parameters), or points along a path. Thus, comparing global map data to local map data can be thought of broadly as merely comparing one or more data points from an electronic device for a particular map location associated with a local coordinate system to global map data associated with a corresponding global map location associated with a corresponding (or overlapping) global coordinate system in the global map to determine if there are differences.

To receive timely and accurate data, it can be useful to receive crowd-sourced information related to routes or areas-of-interest commonly used by the autonomous vehicles. Receiving data from multiple sources increases the likelihood that timely data is received. In addition, obtaining data from multiple sources enables the data to be verified. In other words, two (or three, or more) users or electronic devices providing sensor data (e.g., image data from one or more cell phone cameras) from a particular location acts to verify the accuracy of the data. In some cases, as discussed below, data from multiple electronic devices can be "fused" together to provide higher resolution, or more complete, data.

If the autonomous vehicles are part of a taxi service, for example, then certain routes, roads, and locations may be more valuable simply due to the frequency of their use. Accurate information regarding areas-of-interest such as, for example, airports, bus terminals, intersections, addresses, and hotels may be considerably more valuable than similar information regarding rural routes. Thus, providing some incentive to receive data from users in high-value locations ensures accurate data and can reduce extraneous data. In some instances, data may be readily available for high traffic areas and incentives may be provided to receive data regarding less traveled routes.

To this end, a system is described that receives data from a plurality of electronic devices, analyzes and compares the data to a global map, and then updates the global map and/or causes the global map to be updated. The techniques and systems described herein may be implemented in a number of ways. Example implementations are provided below with reference to the following figures.

As shown in FIG. 1, the system 100 can include a global map server 102, a map scheduling server 104, and a plurality of electronic devices 106. The electronic devices 106 may be part of or disposed in vehicles 108 and may include an app 110 for gathering and sending local map data 112 from the electronic device 106 to the global map server 102. The global map server 102 can then compare the local map data 112 provided by electronic devices 106 to high-resolution global map data 114 stored on, or accessible by, the global map server 102 to validate the local map data 112 and identify any mismatches, or differences, between the global map data 114 and the local map data 112 provided by the electronic devices 106. When differences are identified, this indicates that the global map data 114 is possibly out of date.

As discussed below, in response to differences identified based on local map data 112 from the electronic devices 106, the global map server 102 can update the global map data 114 and/or cause the map scheduling server 104 to schedule the area in question for remapping by a mapping vehicle 116.

In some examples, the electronic device 106 can be mounted in, or be a component of, a vehicle 108. The vehicles 108 in this example can comprise many types of road vehicles including, but not limited to, motorcycles, passenger cars and trucks, delivery vehicles, semi-trucks, and taxies. In some examples, the vehicles 108 could also include non-road vehicles, such as earth-moving equipment, for example, to update site maps. Train passengers can provide route information, for example, and detect changes in routing due to construction or maintenance. In some examples, the electronic device 106 can also comprise, for example, a cell phone, tablet, action cameras (e.g., GoPro cameras), or other devices worn, or carried, by users (e.g., pedestrians, runners, etc.), mounted to bicycles, or other modes of transportation. Regardless of the source or vehicle 108, using multiple electronic devices 106 in multiple vehicles 108 can provide "crowd sourced" data that covers broad areas and provides up-to-date data. In some examples, as discussed below, the system 100 can also provide incentives to users to cover areas-of-interest or routes of particular interest. In some examples, the electronic device 106 can also comprise, for example, a cell phone, tablet, action cameras, or other devices worn, or carried, by users (e.g., pedestrians, runners, etc.), mounted to bicycles, or other modes of transportation.

The electronic devices 106 can communicate with the global map server 102 via a cellular, wireless, Bluetooth®, or radio frequency communication channel. In some examples, the electronic devices 106 can communicate with the global map server 102 via a cellular connection over one or more cell towers 118. The app 110 can enable users to receive updates and mapping requests from the global map server 102 and to provide the local map data 112 to the global map server 102.

In some examples, when the global map server 102 determines that there is a mismatch, or difference, between the local map data 112 and the global map data 114, the global map server 102 can communicate with the map scheduling server 104 to schedule one or more mapping vehicles 116 to map, or remap, the area surrounding the difference. In other examples, when the global map server 102 determines that there is a difference between the local map data 112 and the global map data 114, the global map server 102 can communicate directly with the one or more mapping vehicles 116 to map, or remap, the area surrounding the difference. The mapping vehicle(s) 116 can then proceed to the area and remap, or remap, a predetermined area (e.g., 1 block, 10 blocks, 1 mile, etc.) surrounding the location of the difference.

In other examples, when a difference is identified, the local map data 112, including raw sensor data from one or more electronic devices 106, can be incorporated directly into the global map data 114. In still other examples, as discussed below, the global map server 102 can broadcast one or more mapping requests to receive local map data 112 from one or more additional users. This additional local map data 112 can be used to confirm or deny the difference. In some cases, this additional local map data 112, including raw sensor data from the electronic device 106, for example, can be used to update the global map data 114 directly.

The mapping vehicle 116 can comprise a car, truck, van, or other vehicle equipped with a plurality of high-resolution sensors capable of rendering high-resolution 2-D, 2.5-D, or 3-D maps for use by various technologies, including autonomous vehicles. The mapping vehicle 116 can include a suite of proximity sensors such as, for example, one or more radar, LIDAR, ultrasonic, and/or infrared proximity sensors. The mapping vehicle 116 can also include one or more navigation sensors such as, for example, high-resolution GPS receivers, inertial navigation, and cellular location services. The mapping vehicle can also include one or more cameras such as, for example, high-resolution still and video cameras, infrared cameras, and other night vision cameras. When compared to the local map data 112 from the electronic devices 106, the data from the mapping vehicle 116 can be significantly higher resolution. Thus, while the GPS receiver in the electronic devices 106 may be accurate to approximately 2 meters (~6 feet), the global map data 114 may be accurate to as little as 1 centimeter (less than ½").

Figure 2A:
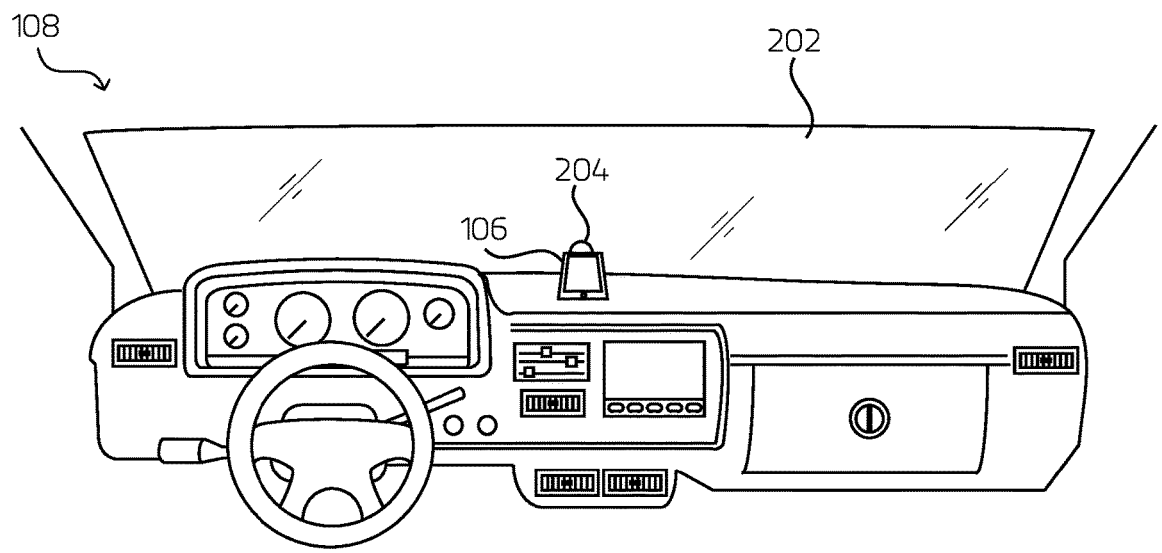
FIGS. 2A and 2B depict a forward-facing configuration for an example electronic device for use with the system of FIG. 1, in accordance with some examples of the present disclosure.

As shown in FIG. 2A, in some examples the electronic device 106 can be mounted to the windshield 202 of the vehicle 108. The electronic device 106 can be mounted to the windshield 202 using a suction cup mount 204, for example, a dash mount, or other suitably stable mount. The suction cup mount 204 can provide an unobstructed view forward for the camera on the electronic device 106. In this manner, the local map data 112 can include still pictures or video from the camera for comparison by the global map server 102. As mentioned above, the local map data 112 can also include sensor data from the electronic devices 106 such as, for example, accelerometer, GPS receiver, altimeter, compass, magnetometer, gyroscope, and/or cellular receiver data.

Figure 2B:
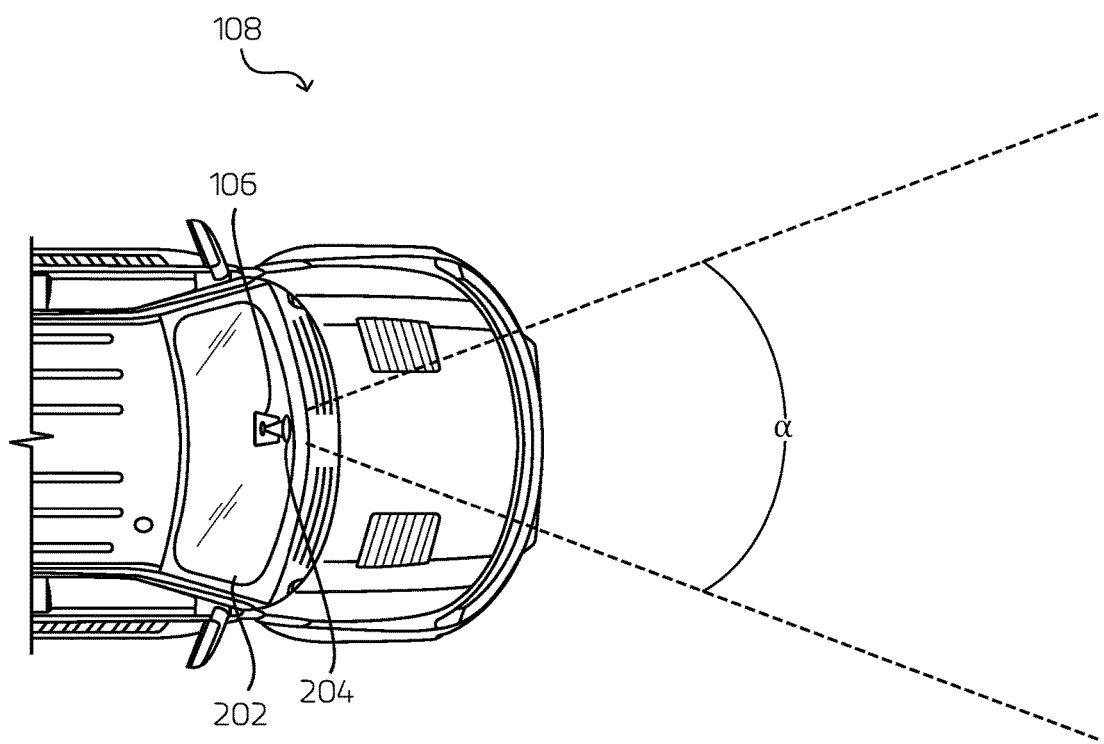

As shown in FIG. 2B, mounting the electronic device 106 on the windshield 202 provides a substantially unobstructed view out the front of the vehicle 108 over the viewing angle, $\alpha$, of the lens of the camera on the electronic device 106. Of course, the electronic device 106 could also be mounted on the outside of the windshield, on the hood, in the grill, or in another appropriate location on the vehicle 108. In other examples, the electronic device 106 can utilize one or more embedded cameras on the vehicle 108 (e.g., parking cameras). In this manner, a fairly wide swath of the road on which the vehicle 108 is traveling can be included in the local map data 112. This can include at least the vehicle's travel lane, for example, and may also include adjacent lanes, sidewalks, landmarks, and buildings close to the road. The forward-facing placement may also enable more thorough image analysis, because the scene is changing more slowly than the scene from a side-facing camera, for example. Because the camera is facing forward, however, the hood may obscure a portion of the view. In addition, because the scene is changing more slowly, there may be fewer points of comparison when comparing the local map data 112 to the global map data 114. Thus, less data may be provided for comparison and verification, among other things.

Figure 3A:
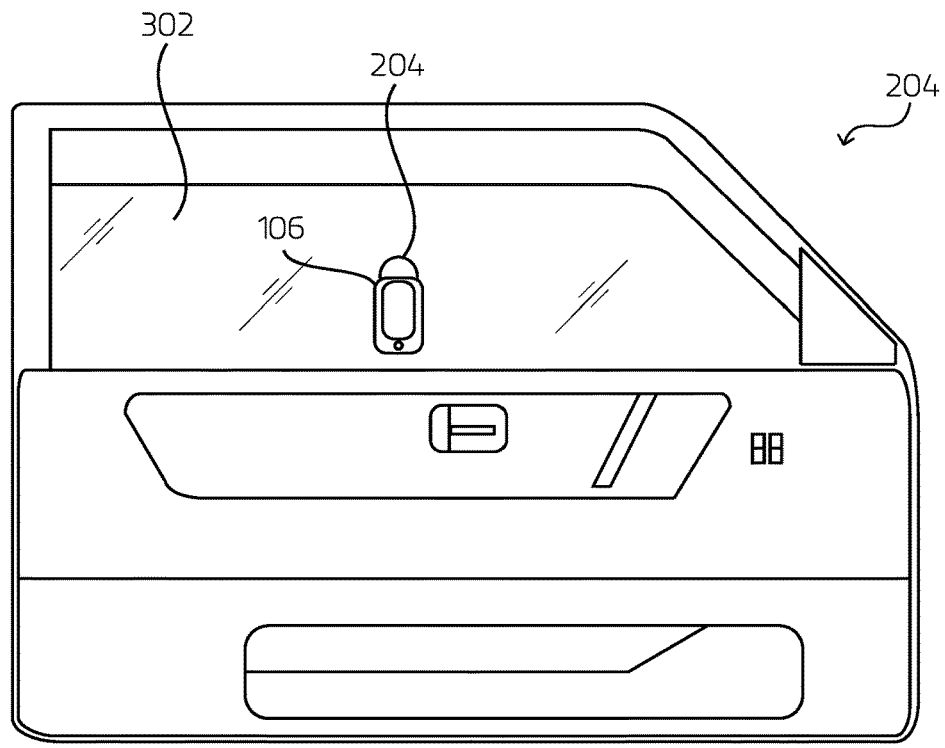
FIGS. 3A and 3B depict a side-facing configuration for an example of an electronic device for use with the system of FIG. 1, in accordance with some examples of the present disclosure.
Figure 3B:
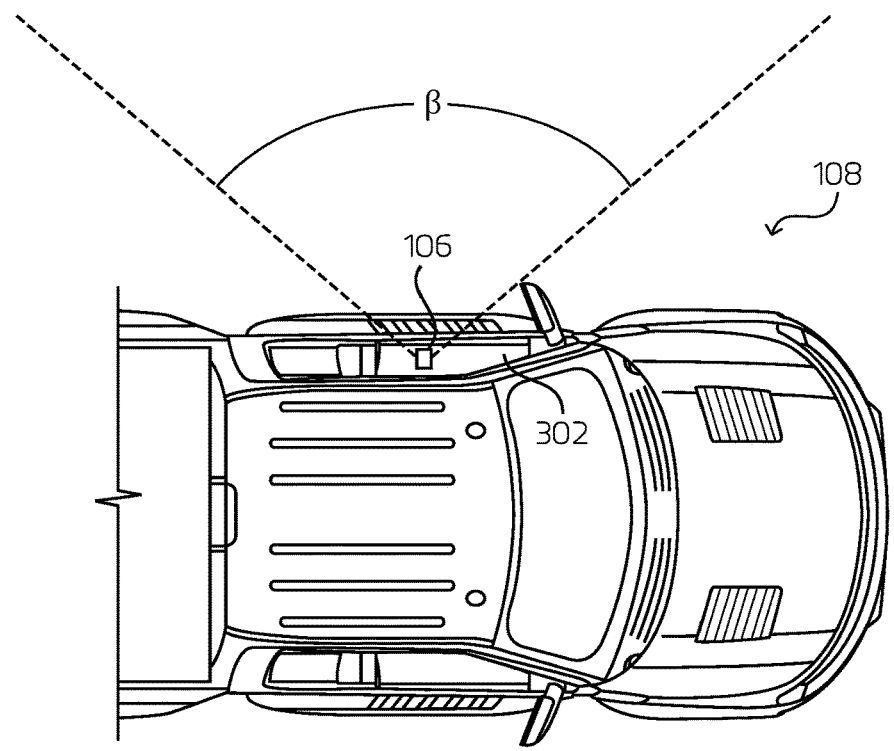

As shown in FIGS. 3A and 3B, in some examples, the electronic device 106 can be mounted to the side of the vehicle 108 or can be a side-mounted vehicle camera (e.g., a parking camera). The electronic device 106 can be mounted to the side window 302 using a suction cup mount 204, for example, or can be clipped to the door panel or window track, among other things. In this configuration, the camera for the electronic device 106 has a side facing perspective. As a result, the camera is almost completely unobstructed by the vehicle 108 over the viewing angle, $\beta$, of the camera.

In some examples, $\alpha$ and $\beta$ may be substantially the same. In other examples, $\alpha$ and $\beta$ may be different because of the different orientation of the cameras. $\alpha$ may be somewhat limited by the A-pillar of the vehicle 108, for example, while, $\beta$ may have a substantially unobstructed view. In some examples, depending on the type of camera, the vehicle 108, and the orientation of the camera, among other things, $\alpha$ and $\beta$ may vary between approximately 30 degrees and 180 degrees.

In some examples, the app 110 can include a calibration component to calibrate the camera on the electronic device 106, or rather calibrate the system 100 to the lens characteristics of the camera (at least to the degree that it is useful for feature-matching). In some examples, this can be done naively by a joint optimization over motion and 3D structure from the motion of the scene provided by the camera over time. The motion estimation can use components from the electronic device 106 such as, for example, the camera (e.g., video), accelerometers, GPS (e.g., velocity and position), and the magnetometer. The lens characteristics of the camera can be estimated initially by using a typical characteristics lookup table based on the electronic device 106 type. Once the lens characteristics of a particular camera for an electronic device 106—which may be uniquely identified by a device ID, for example—are estimated to the desired degree, these characteristics can be reused on future local map data 112 and other data sequences.

In addition, when the vehicle 108 is moving, the scene is changing more quickly and completely than in the forward perspective. In other words, the scene at a particular depth changes completely over the length of the viewing angle. For objects close to the road, for example, the scene may change completely in a matter of tens of feet. As a result, the global map server 102 is provided with additional data and points for comparison. Of course, this may also result in the app 110 consuming additional resources (e.g., bandwidth, battery, etc.) to provide more local map data 112.

In some examples, the electronic device 106 can be mounted with a slightly forward or rearward orientation, or a semi-side view. In this position, a compromise between the forward-looking and side-looking camera can be achieved. In other words, more data may be available in this position than the in the purely forward view, yet bandwidth may be somewhat decreased in comparison to the pure side view.

Figure 4:
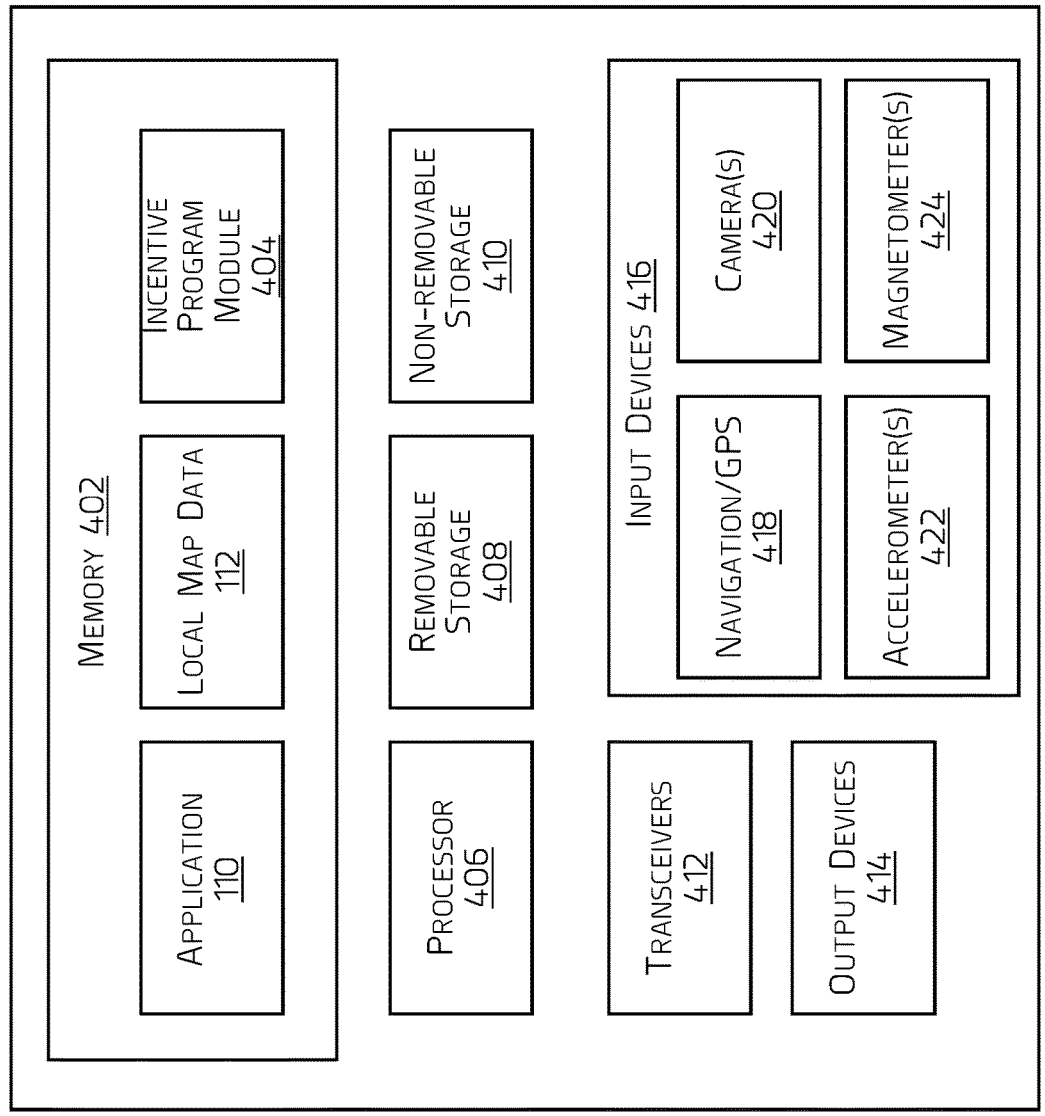
FIG. 4 is a component level schematic diagram of an example of an electronic device for use with the system of FIG. 1, in accordance with some examples of the present disclosure.

As shown in FIG. 4, the system 100 can include a plurality of electronic devices 106 to provide crowd-sourced data to the global map server 102. To this end, the electronic devices 106 can comprise cell phones, smart phones, laptops, tablets, or other electronic devices that comprise a number of components to gather and send the local map data 112 to the global map server 102. In some examples, the electronic device 106 can also comprise embedded vehicle electronics such as, for example, onboard GPS, entertainment systems, or trip computers. The electronic device 106 can comprise memory 402 configured to include computer-executable instructions including at least the app 110, the local map data 112, and an incentive program module 404. The electronic device 106 can also include one or more processors 406, removable storage 408, non-removable storage 410, transceivers 412, output devices 414, and input devices 416.

In various implementations, the memory 402 can be volatile (such as random access memory, or RAM), non-volatile (such as read-only memory, or ROM, flash memory, etc.), or some combination of the two. The memory 402 can also include the app 110. As discussed below, the app 110 can provide the user with a user interface (UI) 600, such as a graphical user interface, that can enable the user to start and stop the app 110, report accidents or construction, and to receive mapping requests and incentives. The app 110 can also gather the desired local map data 112 from the various input device(s) 416 of the electronic device 106.

The app 110 can also package the local map data 112, as necessary, to be sent to the global map server 102 In some examples, the app 110 can stream raw sensor data from one or more sensors on the electronic device 106 to the global map server 102 in real-time, or near real-time. In other examples, the app 110 can compile and store the local map data 112 in the memory 402 and send periodic updates, or data packages. The app 110 can use the transceiver(s) 412 directly via a radio interface layer (RIL), or other controller, to send the local map data 112 to the global map server 102 via the transceiver(s) 412.

In some examples, the local map data 112 can comprise raw sensor data (e.g., camera images, IMU data, etc.) sent to the global map server 102 in its raw form. In other words, the local map data 112 can simply be sent as raw sensor data as opposed to having a data structure. This can enable the local map data 112 to be jointly reconstructed with data from other devices and reconstructed with more powerful machines. In additions, using raw data obviates the need to provide the electronic devices 106 with proprietary algorithms regarding locating the data in a local or global coordinate system, identifying features, or other processing. In some examples, the local map data 112 can be anonymized to protect users and prevent tracking of their movements, among other things. In other examples, the local map data 112 can be compressed (either lossless or lossy) prior to being sent to the global map server 102. In still other examples, the local map data 112 can be provided in a 3-D topological structure such as, for example, a k-dimensional (KD) Tree or in records in a geospatial database.

In some examples, the memory 402 can also store the local map data 112. The local map data 112 can include the data provided by the various input device(s) 416, discussed below, such as video and still images, GPS coordinates, accelerometer readings, etc. The local map data 112 can enable the global map server 102 to determine when the global map data 114 needs to be updated or supplemented. This may be due to more permanent, or long term, changes in the global map data 114 such as, for example, road openings and closings, long-term construction projects, and new buildings. This may also be due to more temporary changes in the global map data 114 such as, for example, accidents, short-term construction projects, and acts of nature (e.g., fallen trees or power poles).

In some examples, the memory 402 can also include the incentive program module 404. To incentivize users to map particulars areas, the incentive program module 404 can provide requests for users to map a particular location, area-of-interest, or route. In addition, the incentive program module 404 can assign a predetermined number of dollars, points, or other incentive (collectively, "values") for each location, area-of-interest, or route.

In other examples, rather than residing on the electronic device 106, the incentive program module 404 can reside on a remote server in communication with the electronic device 106. The incentive program module 404 can be stored on, for example, the global map server 102, the map scheduling server 104, or other remote server. The remote server can, in turn, be in communication with the electronic device 106 via the app 110, for example, and with the user's financial institution, among other things.

If a route is often used by a fleet of autonomous taxies or other vehicles that utilize the global map data 114, for example, then the incentive program module 404 can assign higher values to that route. Thus, a major thoroughfare in a large city, an airport, and a taxi stand in a hotel district may all be considered high-value. A rural highway or the downtown area of a small town, on the other hand, may be considered a medium- or low-value.

In other examples, the value of data about a particular area-of-interest, route, or location may also be based at least in part on a length of time since the global map data 114 for the area, route, or location has been updated. For instance, if the global map data 114 for a particular area, route, or location has not been updated recently (e.g., within a predetermined threshold amount of time), the value may be higher than for another area, route, or location that has been updated more recently. Thus, in some examples, the value of data about a particular area, route, or location may be a function of time since last global map data 114 update.

As discussed below, the value of a particular location, area, or route may also vary depending on whether the local map data 112 indicates a possible difference when compared to the global map data 114. In other words, if the local map data 112 indicates an accident or construction not previously included in the global map data 114, for example, the value in that area may be temporarily raised to motivate users to map and confirm the area. In some examples, once the area has been mapped by multiple users for confirmation purposes, for example, the value in that area may be returned to its previous level. In other examples, the value in the area may be maintained at a slightly higher level to monitor "progress" in the area (e.g., completion of construction, removal of the accident, etc.)

In some implementations, the processor(s) 406 can comprise a central processing unit (CPU), a graphics processing unit (GPU), both a CPU and a GPU, and/or any other sort of processing unit. The processor(s) 406 can be responsible for running software on the electronic device 106, including the app 110 and incentive program module 404, and to interpret and send messages to the global map server 102. In some examples, the processor(s) 406 can also perform calculations and provide instructions to the based on the various input device(s) 416 and output device(s) 414.

The electronic device 106 can also include additional data storage devices (removable and/or non-removable) such as, for example, magnetic disks, optical disks, or tape. Such additional storage is illustrated in FIG. 4 by removable storage 408 and non-removable storage 410. The removable storage 408 and non-removable storage 410 can store the various modules, programs, and algorithms for the app 110, navigation, data gathering, and incentive processes and can include routines for receiving and scheduling mapping requests, among other things.

Non-transitory computer-readable media may include volatile and nonvolatile, removable and non-removable tangible, physical media implemented in technology for storage of information, such as computer readable instructions, data structures, program modules, or other data. The memory 402, removable storage 408, and non-removable storage 410 are all examples of non-transitory computer-readable media. Non-transitory computer-readable media include, but are not limited to, RAM, ROM, electrically erasable programmable read-only memory (EEPROM), flash memory or other memory technology, compact disc-ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the electronic device 106. Any such non-transitory computer-readable media may be part of the electronic device 106 or may be a separate device (e.g., a jump drive) or a separate database or databank (e.g. at the global map server 102 or map scheduling server 104).

The transceiver(s) 412 can include any sort of transceivers known in the art. The transceiver(s) 412 may include wireless modem(s) to facilitate wireless connectivity with the global map server 102, other users, the Internet, and/or an intranet. In some examples, the transceiver(s) 412 can include, for example, radio transceivers that perform the function of transmitting and receiving radio frequency communications via an antenna (e.g., cellular, Wi-Fi, or Bluetooth®). In other examples, the transceiver(s) 412 may include wired communication components, such as a wired modem or Ethernet port, for communicating with a local area network (LAN) or a cable area network (CAN)—e.g., an in vehicle communications hub. In still other examples, the electronic device 106 can be an embedded electronic device 106 in the vehicle and can be connected to the vehicle wiring harness, CAN, or other vehicle-based network.

In either case (i.e., wireless or wired communications), the electronic device 106 may communicate directly with the global map server 102 via the wireless connection (e.g., a cellular connection), for example, or indirectly via an in-vehicle communications system. Thus, the electronic device 106 may be connected to the vehicle 108 wirelessly via a Bluetooth® connection, for example, or using a wired connection such as an Ethernet or universal serial bus (USB) connection, with the vehicle 108 acting as a wireless hub. In this configuration, the electronic device 106 can communicate with the vehicle 108 and the vehicle 108 can communicate with the global map server 102, other users, the Internet, and/or an intranet.

In some implementations, the output device(s) 414 can include any sort of output devices known in the art, such as a display (e.g., a liquid crystal display (LCD), a light emitting diode (LED) display, or thin film transistor (TFT) screen), a touchscreen display, lights, speakers, a vibrating mechanism, or a tactile feedback mechanism to provide interactive feedback to the user. In some examples, the output device(s) 414 can play various sounds based, for example, on whether the user has entered an area-of-interest, has varied from a particular route, or has received a new mapping request, among other things. Output device(s) 414 also include wired and/or wireless connections for one or more peripheral devices, such as headphones, peripheral speakers, or a peripheral display.

In various implementations, input device(s) 416 can include any sort of input devices known in the art. For example, input device(s) 416 may include a microphone, a keyboard/keypad/touchpad, a touch-sensitive display, one or more cameras, proximity sensors, accelerometers, altimeters, gyroscopes, and other sensors. A keyboard/keypad may be a standard push control alphanumeric, multi-key keyboard (such as a conventional QWERTY keyboard), a touchscreen keyboard, or one or more other types of keys or controls, and may also include a joystick, wheel, and/or designated navigation controls, or the like. In some examples, the input device(s) 416 can also include communication ports to receive data from external sensors or cameras, among other things.

As shown in FIG. 4, in some examples, the input device(s) 416 can specifically include navigation module(s) 418, camera(s) 420, accelerometer(s) 422, and magnetometer(s) 424, among other things. In this configuration, the navigation module 418 can provide location data for inclusion in the local map data 112. The navigation module 418 can include, for example, an onboard GPS receiver, cellular location services, internet-based location services, or a combination thereof.

The camera(s) 420 can comprise one or more standard cameras 420 on the electronic device 106 or on the vehicle 108. This can include a forward and/or rearward looking camera(s) 420. This can also include an array of cameras that can provide up to a 360-degree view. In some examples, the camera(s) 420 can be existing parking cameras associated with the vehicle 108 and accessed by the electronic device 106 via the aforementioned wired or wireless connections. The camera(s) 420 can provide streaming video, still pictures, or combinations thereof to the app 110 for inclusion in the local map data 112.

The camera(s) 420 may provide periodic updates based on, for example, the velocity of the vehicle 108, the depth of field of the current view, and the placement of the camera(s) 420, among other things. As discussed above, it may be desirable for a side-facing camera 420 to provide more rapid updates, for example, because the scene in front of the camera 420 is changing more rapidly than in a front-facing configuration. If the vehicle 108 accelerates from a relatively low speed to a higher speed, on the other hand, the frame rate of the camera(s) 420 can be increased proportionally to the velocity of the vehicle 108 (and vice-versa). In some examples, the frame rate can be increased based on a speed signal from the navigation module 418, for example, or a vehicle speedometer. In some examples, at a predetermined speed, the camera(s) 420 may switch from still pictures to video due to the increased frame rate required—i.e., the scene is changing to quickly too be effectively depicted with still images. When the vehicle 108 returns below the predetermined speed, the camera(s) 420 may revert to periodically updated still images.

The accelerometer(s) 422 can provide acceleration data for the electronic device 106 and, by extrapolation, for the vehicle 108. This may be useful to change the frame rate and/or switchover from still images to video, as discussed above. This may also be useful to enable the app 110 to detect a triggering event such as, for example, unexpected turns or swerves, which can indicate construction or accidents, among other things. A trigger event can comprise a swerve that causes the accelerometer(s) 422 to read an acceleration rate above a predetermined level (e.g., 0.3G, 0.5G, etc.) that is in excess of the acceleration associated with normal maneuvering (e.g., turning, accelerating, and braking). The predetermined level of acceleration may be different for different for different types of vehicles. A sports car may be capable of generating higher cornering and braking forces than a minivan, for example, justifying a higher threshold.

In some examples, the triggering even can comprise the vehicle 108 traveling along a straight road with no turns, but nonetheless making a turning maneuver. In this case, the app 110 may request an update from the user (e.g., "Would you like to report an accident?") or tag the local map data 112 to track the unexpected maneuver. In some examples, the app 110 may temporarily increase the frame rate on the camera(s) 420, switchover to video, or increase the camera resolution for a predetermined length of time (e.g., 1 second, 3 seconds, etc.) to capture additional data about the cause of the triggering event. Similarly, in response to a swerve to the left, for example, the app 110 may increase the frame rate or resolution of the camera(s) 420 on the right side of the vehicle 108. This may prompt the global map server 102 to more carefully scrutinize the tagged local map data 112, for example, or to create additional mapping requests for the area.

Similarly, the magnetometer(s) 424 can be used to determine the direction of travel of the vehicle 108. This can be used to orient the video data from the camera(s) 420, for example, and can be used to detect triggering events, such as unexpected changes in the direction of travel. If a user has been requested to drive down and map a busy road by the incentive program module 404, for example, but nonetheless turns off the road, the system 100 may be prompted to ask the user to report an accident, or provide some other explanation. In some examples, the app 110 can provide a plurality of reporting controls such as, for example, "traffic," "construction," or "change in plans" buttons or controls to enable the user to provide feedback quickly and easily regarding the course deviation. In other examples, the app 110 can prompt the user to type a similarly short text message, for example, or provide a short voice response to supplement the local map data 112. A verbal call and response can enable the user to provide timely feedback with limited distraction, for example, and without taking his/her hands of the steering wheel.

Figure 5A:
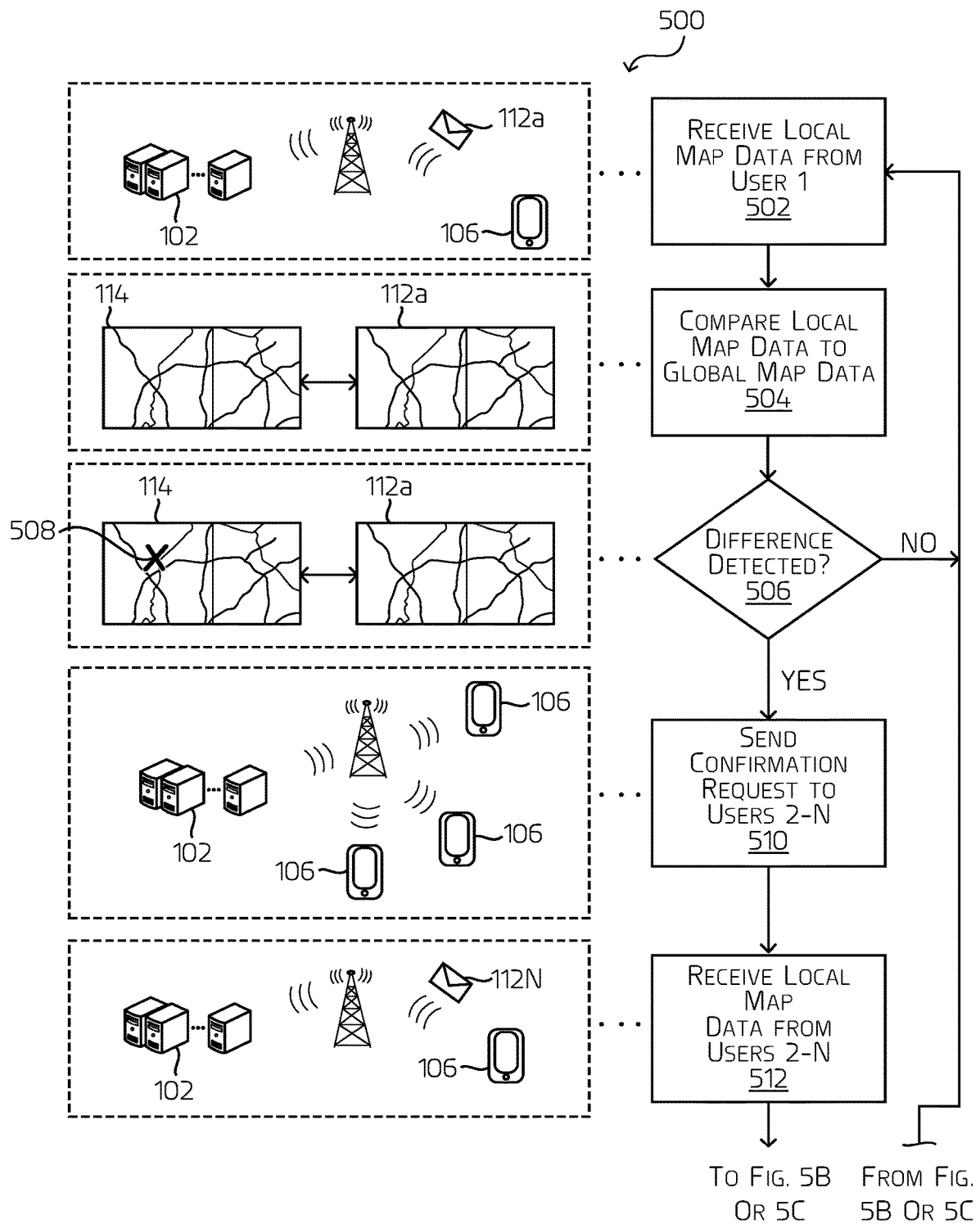
FIGS. 5A-5C are flowcharts depicting an example of a method to detect and update differences between the global map data and local map data from one or more electronic devices, in accordance with some examples of the present disclosure.
Figure 5B:
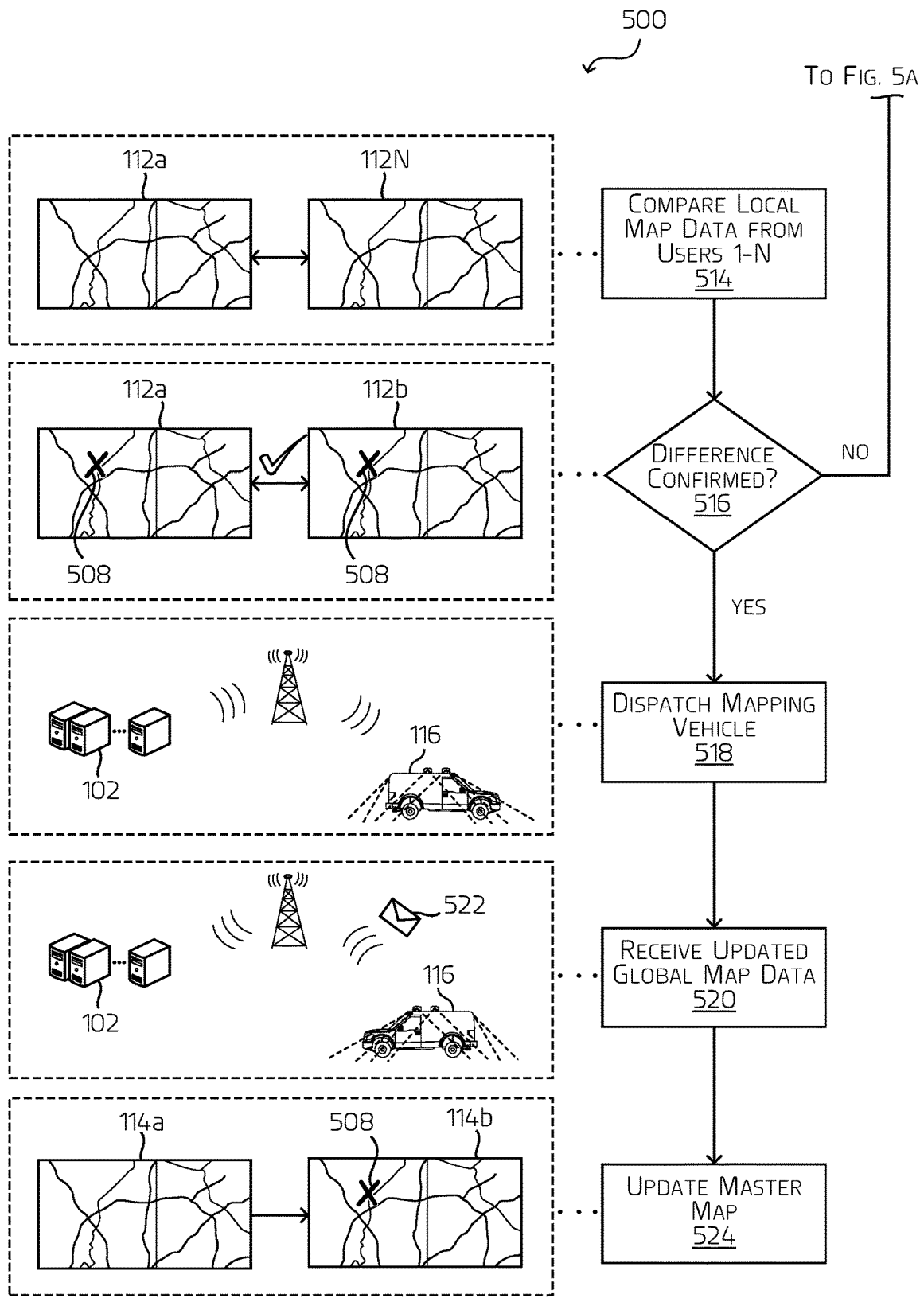
Figure 5C:
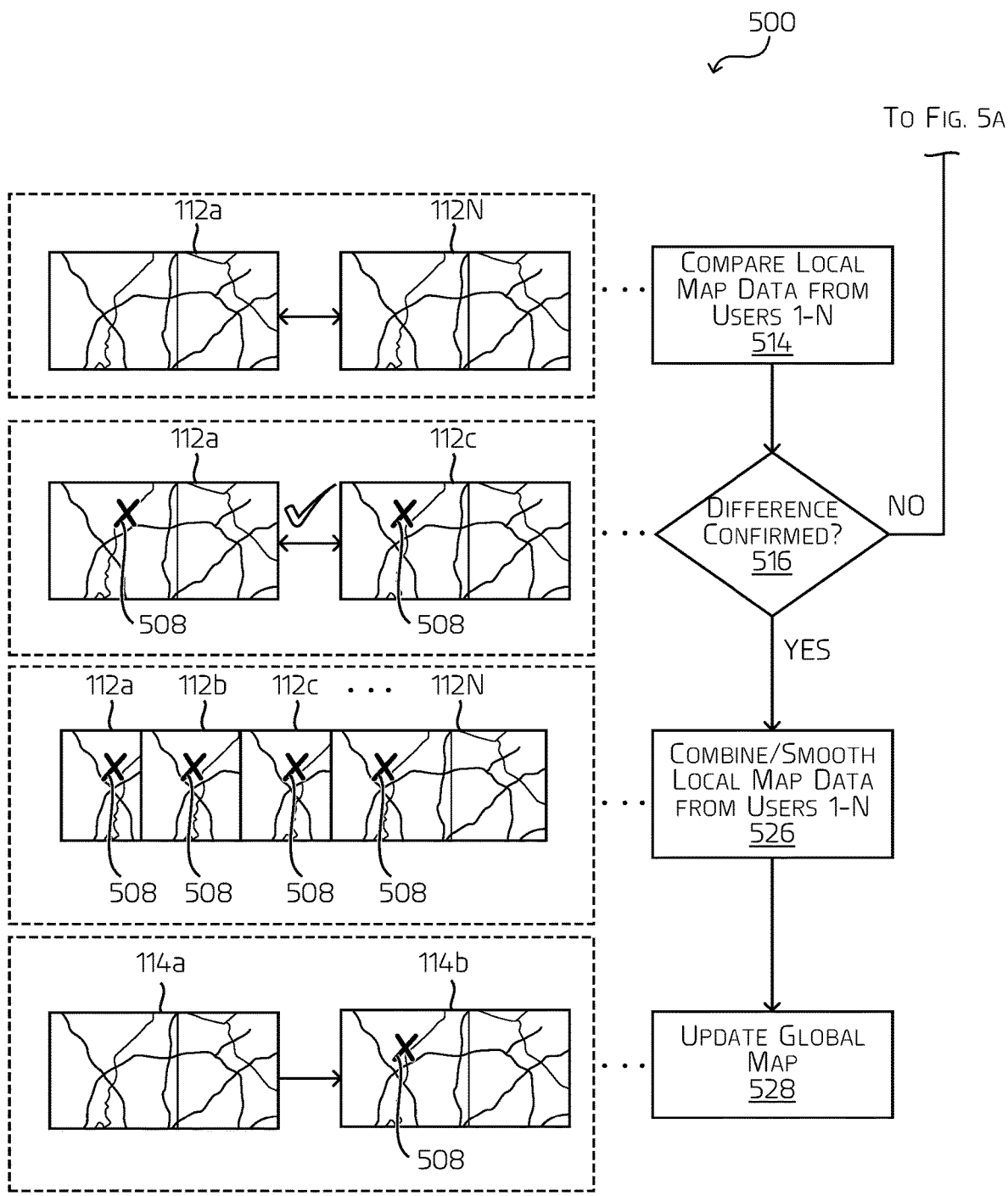

As shown in FIGS. 5A-5C, examples of the present disclosure can also comprise a method 500 for updating the global map data 114. The global map server 102 can use data from a plurality of electronic devices 106 running the app 110 to detect and analyze differences 508 between the global map data 114 and the local map data. The global map server 102 can then either use a mapping vehicle 116 (FIG. 5B) or one or more electronic devices 106 (FIG. 5C) to update the global map data 114.

At 502, the global map server 102 can receive first local map data 112a from an electronic device 106 associated with User 1 of the plurality of users. As mentioned above, the first local map data 112a can include, for example, location (e.g., GPS coordinates), acceleration, and/or direction information. The first local map data 112a can also include image data (e.g., photo or video data), such as a first image, from the camera(s) 420 of the electronic device 106. This can include high- or low-resolution still photos, video streams, or other image data. As discussed above, the electronic device 106 can be mounted in a vehicle 108 or bicycle, for example, or carried by a pedestrian, among other things.

At 504, the global map server 102 can use the first local map data 112a to locate and compare the first local map data 112a to the global map data 114 for that area. Based on the GPS coordinates provided in the first local map data 112a, for example, the global map server 102 can locate the correct portion of the global map data 114, retrieve image data associated with that location, such as a second image, and compare features from the first local map data 112a to features from the global map data 114. The comparison may be image comparison, for example, using standard image comparison analysis, such as for example, keypoint matching, histogram methods, or keypoints with decision trees. This can also include, for example, bag of words, various simultaneous localization and mapping (SLAM) techniques—such as Kalman filters or relative SLAM (rSLAM), Compressible Earth Mover's Distance (CEMD), or any other algorithm which can localize based on image data. See, e.g., U.S. Pat. No. 7,602,976 (issued Oct. 13, 2009) (discussing CEMD).

For the sake of clarity and ease of discussion, the method 500 is discussed below as comparing "images" from various sources. As mentioned above, however, the method 500 can also, or instead, compare many types of data from different sensors, such as LIDAR or radar signatures, for example, for the comparison. Thus, the terms "image" and "image comparison," as used herein, can be more broadly thought of as feature comparison between one set of data and another set of data and need not be limited to image data or image comparison. Indeed, many types of raw sensor data from the electronic device 106 can be used to locate differences between the local map data 112 and the global map data 114. The system 100 can compare data, such as image data (including individual pixels or groups of pixels), LIDAR, radar, or infrared signatures, or any other sensor data associated with a particular position or location. The system 100 can then compare the features found in a particular position or location in the local map data 112 to the features found in the same position or location in the global map data 114 to identify differences.

In some examples, the global map data 114 can be used to photo-realistically render the same scene provided in the local map data 112 by placing a virtual camera in the scene with the aforementioned estimated lens characteristics for the electronic device 106 and an estimation regarding position and orientation. In some examples, the global map data 114 can include enough data to enable the virtual scene to have the same time-of-day and weather characteristics, for example, as the image data provided by the local map data 112. The method 500 can then compare features from the local map data 112 to the virtual scene from the global map data 114 using any of the abovementioned techniques.

At 506, based on the image comparison, or more specifically a feature comparison from the images, the global map server 102 can determine if there are any differences 508, between features in the first image and the second image. The difference 508 can include any difference in features (e.g. a representation of features and coordinates, images, surfaces, voxels, etc.) between the local map data 112 and the global map data 114. The difference 508 can include differences between the features on the images caused by physical objects such as, for example, construction barrels, an accident, new lanes, or a new building or other structures, or simply a change in one or more features of the data.

The difference 508 may be temporary or permanent in nature and thus, may or may not warrant an update to the global map data 114. In some examples, a difference 508 may be detected a predetermined number of times or for a predetermined amount of time, for example, before the global map data 114 is updated. In other examples, the global map data 114 can be updated dynamically, including all reported and confirmed differences 508. In still other examples, the accuracy of the local map data 112 can be determined and the local map data 112 can be assigned a weight based on the determined accuracy. The application of the local map data 112 to the global map data 114 can then be based on the weight of the local map data 112. Examples of several techniques can be found in U.S. patent application Ser. No. 14/932,963, filed Nov. 4, 2015, entitled, "Adaptive Mapping to Navigate Autonomous Vehicles Responsive to Physical Environmental Changes," and U.S. patent application Ser. No. 14/932,940, filed Nov. 4, 2015, entitled, "Automated Extraction of Semantic Information to Enhance Mapping Modifications for Robotic Vehicles," both of which are incorporated by reference herein as if fully set forth below.

At 506, if no differences are detected between the first local map data 112a and the global map data 114, then the first local map data 112a from User 1 can be discarded and the method 500 can return to accept additional local map data 112 (from User 1, or another user), at 502. If, on the other hand, one or more differences 508 are detected, the method 500 can continue by verifying and/or updating the global map data 114, as discussed below.

At 510, when a difference 508 is detected, in some examples, the global map server 102 can send one or more mapping requests, via the app 110, to prompt one or more additional users to map the area-of-interest or route. In some examples, the number of requests sent (or accepted) by the global map server 102 can be determined by the number of users within some predetermined distance from the area-of-interest or route (e.g., within 10 blocks, 1 mile, or 5 miles). In other examples, the number of requests sent (or accepted) can be determined by the priority of the area-of-interest or route. In some examples, priority can be set based on the last time the area-of-interest was mapped. In other words, in some examples, areas-of-interest that have not been mapped in the longest amount of time are given highest priority. This can help to ensure neglected areas are properly mapped. In other examples, if the area-of-interest is an airport, hotel, convention center, or other high value location, for example, then more, more frequent, or faster confirmations may be desired. In still other examples, the priority can be set higher for areas-of-interest or high traffic areas (e.g., urban areas with many features, busy intersections, areas of high construction activity, etc.).

As a result, the global map server 102 may assign a higher value (e.g., pay more money) to users to map the area-of-interest, or accept more users to map the area. If the area-of-interest is less important (e.g., less frequented by the taxies, recently updated, etc.), then the global map server 102 may send (or accept) only a single request, set a lower value on the map, or ignore the difference 508 altogether.

At 512, the global map server 102 can receive additional local map data 112N from Users 2-N depending on the number of requests sent and/or accepted. The additional local map data 112N can include substantially the same information as the first local map data 112a and in substantially the same area-of-interest or along the same route. The location of the additional local map data 112N is preferably within a relatively short distance from the location of the first local map data 112a, but need not be exact.

Upon receiving the additional local map data 112N, the method 500 can follow at least two paths. As shown in FIG. 5B, in response to confirming the presence of a difference 508, the method 500 can dispatch a mapping vehicle 116 to remap the area and then update the global map data 114, as necessary. As shown in FIG. 5C, on the other hand, in response to confirming the presence of a difference 508, the method 500 can dispatch one or more additional users and then update the global map data 114 using the additional local map data 112N, which may be combined or fused.

At 514, therefore, the global map server 102 can compare the data and images from the first local map data 112a associated with User 1 to the additional local map data 112N. This can be a point-by-point, histogram, or other comparison technique for comparing images and data from the first local map data 112a to the images and data from the additional local map data 112N. As mentioned above, the number of additional users requested can depend, for example, on the importance of the area-of-interest. Thus, the global map server 102 could receive one, two, or more additional local map data 112N for comparison.

The global map server 102 can compare the first image (or other data) from the first local map data 112a to a third image (or other data) from a second local map data 112b from User 2, for example. This can serve to confirm or deny the difference 508 allegedly detected in the first image from the first local map data 112a. The number of comparisons used by the global map server 102 can be based on a number of factors. The number of comparisons may be determined by the size or severity of the difference 508, for example, whether the difference 508 is confirmed in one or more additional local map data 112N, and the importance of the area-of-interest. If the difference 508 is confirmed in the third image, for example, but not in a fourth, then the global map server 102 may perform an additional "tie-breaker" comparison. If the difference 508 is relatively large and easy to decipher, on the other hand (e.g., multiple lane closures, new building or construction, etc.), then a single confirmation may suffice.

At 516, the global map server 102 can determine if the difference 508 is confirmed or not. This may require confirmation of the difference in one or more additional local map data 112N. If the difference 508 was caused by a pedestrian walking across the street, for example, then the pedestrian is likely not in the third image (or subsequent images). If the difference 508 does not persist, then the difference 508 is not confirmed and the method 500 discards all additional local map data 112N for the area-of-interest and iteratively returns to receiving local map data from User 1 (or another user), at 502.

At 518, if the difference 508 is confirmed (using one or more comparisons) the global map server 102 can request a mapping vehicle 116 to be dispatched to the area-of-interest or route. As mentioned above, in some examples, the global map server 102 can send a request to the map scheduling server 104, which can, in turn, dispatch the mapping vehicle 116. In other examples, the global map server 102 may communicate directly with the mapping vehicle 116 to request a remap of the area-of-interest or route. In still other examples, the global map server 102 may generate an exception report, send an e-mail, or otherwise alert a worker or system to dispatch the mapping vehicle 116.

At 520, the global map server 102 can receive updated high-resolution mapping data 522 from the mapping vehicle 116. As mentioned above, this can include high-resolution photo or video, LIDAR, radar, and other high-resolution data used to create the 2-D, 2.5-D, or 3-D global map data 114. At 524 the global map server 102 can update the global map data 114 to include the updated high-resolution mapping data 522 from the mapping vehicle 116. This can include combining new global map data 114a with old global map data 114b, or replacing part or all of the global map data 114 associated with the area-of-interest or route. Examples of map updating techniques and methods are described in the '963 Application, discussed above. See, e.g., '963 Application, ¶¶ 71, 155, and 168.

As shown in FIG. 5C, in some examples, data from one or more electronic devices 106 can be utilized to update the global map data 114 obviating the need to send a mapping vehicle 116. This may reduce the cost to update the global map data 114, but may be at the expense of some data resolution. In other words, because the local mapping data 112 is provided by more general electronic devices 106, it may provide lower resolution data than the data provided by the mapping vehicle 116. In low traffic, or otherwise low interest areas, this low resolution data may be acceptable, especially in light of its lower cost.

In some examples, data from multiple users can be utilized to "synthetically" increase the resolution of the data. In other words, as in image fusing, multiple sets of overlapping local map data 112 can be "fused" together to increase resolution, fill holes, smooth, and increase the accuracy of the data to create a high-resolution dataset. In this light, in some examples, the number of mapping requests can be based on an approximation of the number of mapping requests required to achieve the desired resolution. In other the examples, the system 100 can continue sending mapping requests until, for example, the desired resolution, a predetermined level of hole filling, or some other metric is achieved.

In some examples, the method 500 can compute the level of entropy, or disagreement, between the local map data 112 and the global map data 114 and minimize that value. In other examples, the method 500 can compute the level of entropy, or disagreement, between one set of local map data 112 and another set of local map data 112 (e.g., local map data 112 from different users) and minimize that value. The level of disagreement, using the CEMD mentioned above, for example, can be derived directly from the matching algorithm.

If multiple local map data 112 have a higher level of correlation to each other than the correlation of any of the local map data 112 to the global map data 114, for example, it may indicate that the global map data 114 is (1) out of date and (2) can be updated from the composite information provided by the local map data 112. This composite information can be generated using, for example, a joint 3-D reconstruction from the new local map data 112. When there is a strong correlation between multiple sets of local map data 112, for example, the 3-D reconstruction created from this local map data 112 can be more heavily weighted when updating the global map data 114. Conversely, when there is a weak correlation between multiple sets of local map data 112, the 3-D reconstruction created from this local map data 112 can be less heavily weighted when updating the global map data 114. In some examples, there may be a predetermined minimum level of correlation required between various sets of local map data 112. Below this level of correlation, the global map data 114 may not be updated at all. The correlation can be determined using a number of methods to determine that a small error is indicated when the matching algorithm compares (1) the new (reconstructed) global map data 114 and the local map data 112 used to generate said the new global map data 114 or (2) the various sets of local map data 112 to each other.

As before, at 514 the global map server 102 can compare the data and images from the first local map data 112a associated with User 1 to the additional local map data 112N associated with Users 2-N. As mentioned above, the number of additional users requested can depend on the importance of the area-of-interest, among other things. Thus, the global map server 102 could receive one, two, or more additional local map data 112N for comparison.

At 516, the global map server 102 can determine if the difference 508 appears in both the first local map data 112a and the third local map data 112c, for example. This can serve to confirm the difference 508 allegedly detected in the first local map data 112a. If the difference 508 was caused by a pedestrian walking across the street, for example, then the pedestrian is likely not in the third image. If not, the difference 508 is not confirmed and the method 500 discards all additional local map data 112N for the area-of-interest and iteratively returns to receiving local map data from User 1 (or another user), at 502.

The number of comparisons used by the global map server 102 can be based on a number of factors. The number of comparisons may be determined by the size or severity of the difference 508, for example, whether the difference 508 is confirmed in one or more additional local map data 112N, and the importance of the area-of-interest or route. If the difference 508 is confirmed in the third image, for example, but not in a fourth, then the global map server 102 may perform an additional "tie-breaker" comparison. If the difference 508 is relatively large and easy to decipher, on the other hand (e.g., multiple lane closures), then a single confirmation may suffice.

At 526, if the difference 508 is confirmed, in some examples, the global map server 102 can combine the additional local map data 112N from the multiple users to smooth, fill, an increase the accuracy of the local map data 112. As shown, the first local map data 112a from User 1 can be combined with the second local map data 112b from User 2, third local map data 112c from User 3, and so on to create a high(er) resolution and/or more accurate update for the global map data 114. Combining the additional local map data 112N can enable images to be smoothed, GPS coordinates to be refined, holes in the data to be filled, and so on. At 528, global map server 102 can update the old global map data 114b using the combined, smoothed, and verified data, or new global map data 114b, from the additional local map data 112N.

Figure 6A:
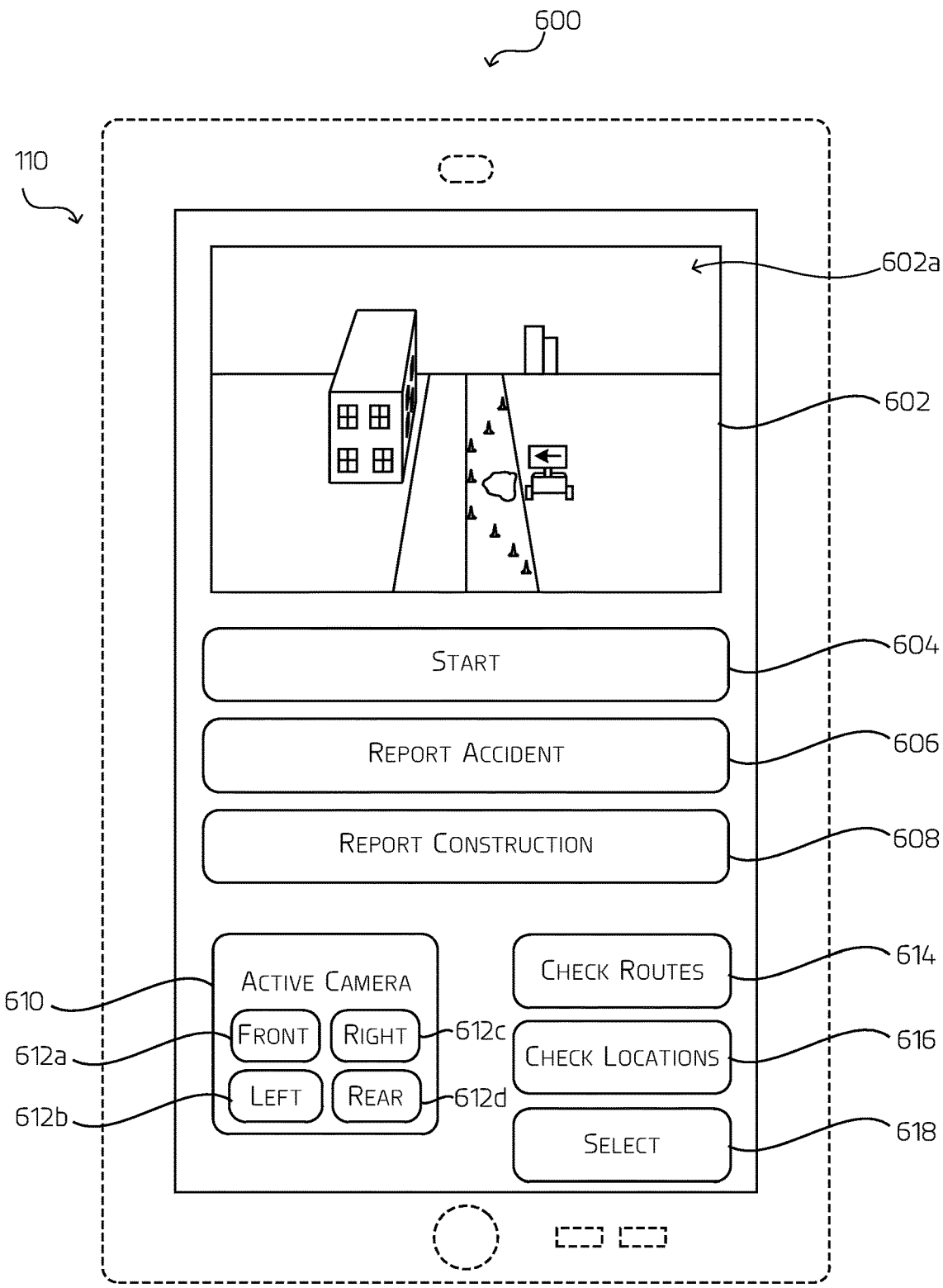
FIGS. 6A-6C depicts an example of a user interface (UI) for use with the system of FIG. 1, in accordance with some examples of the present disclosure.
Figure 6B:
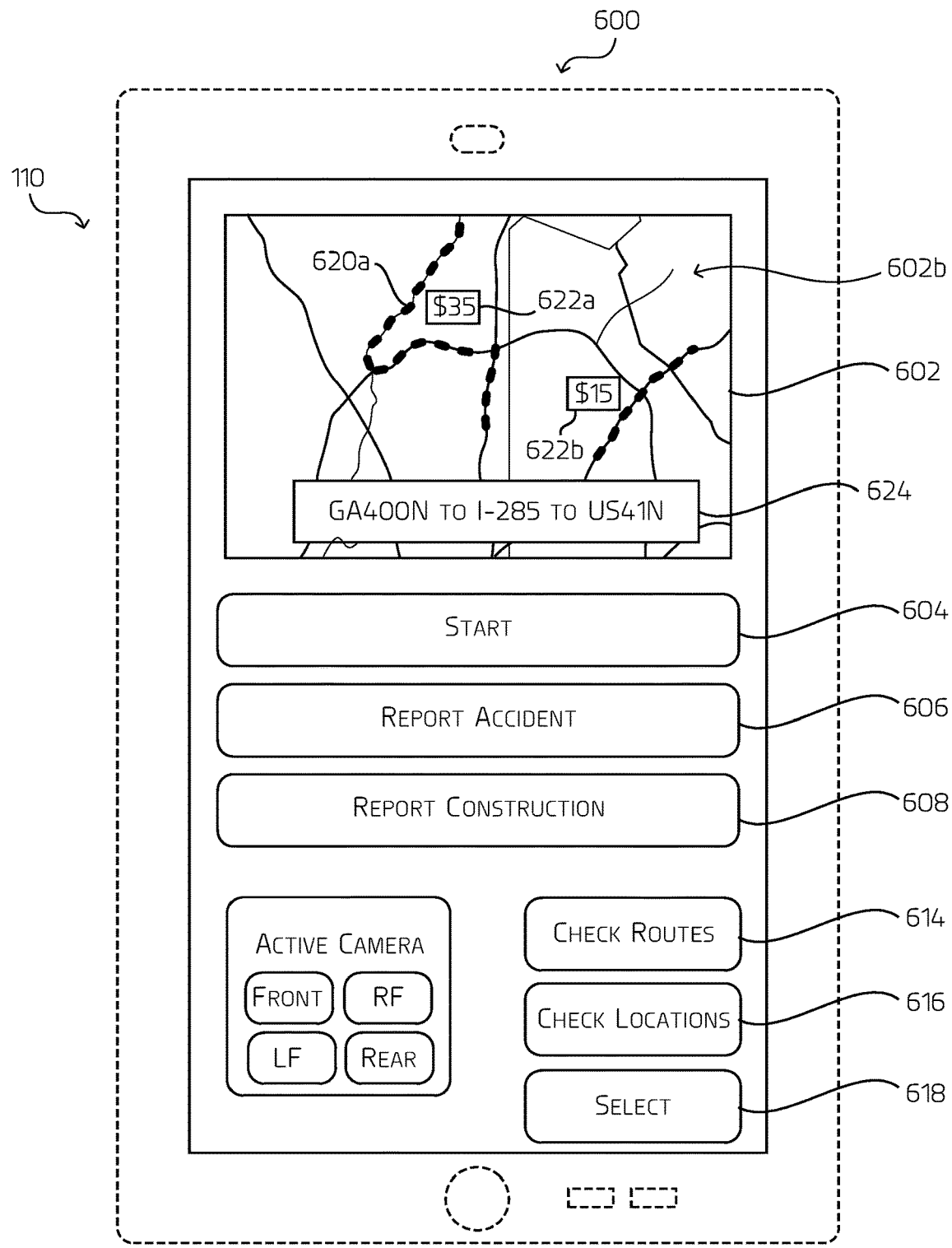
Figure 6C:
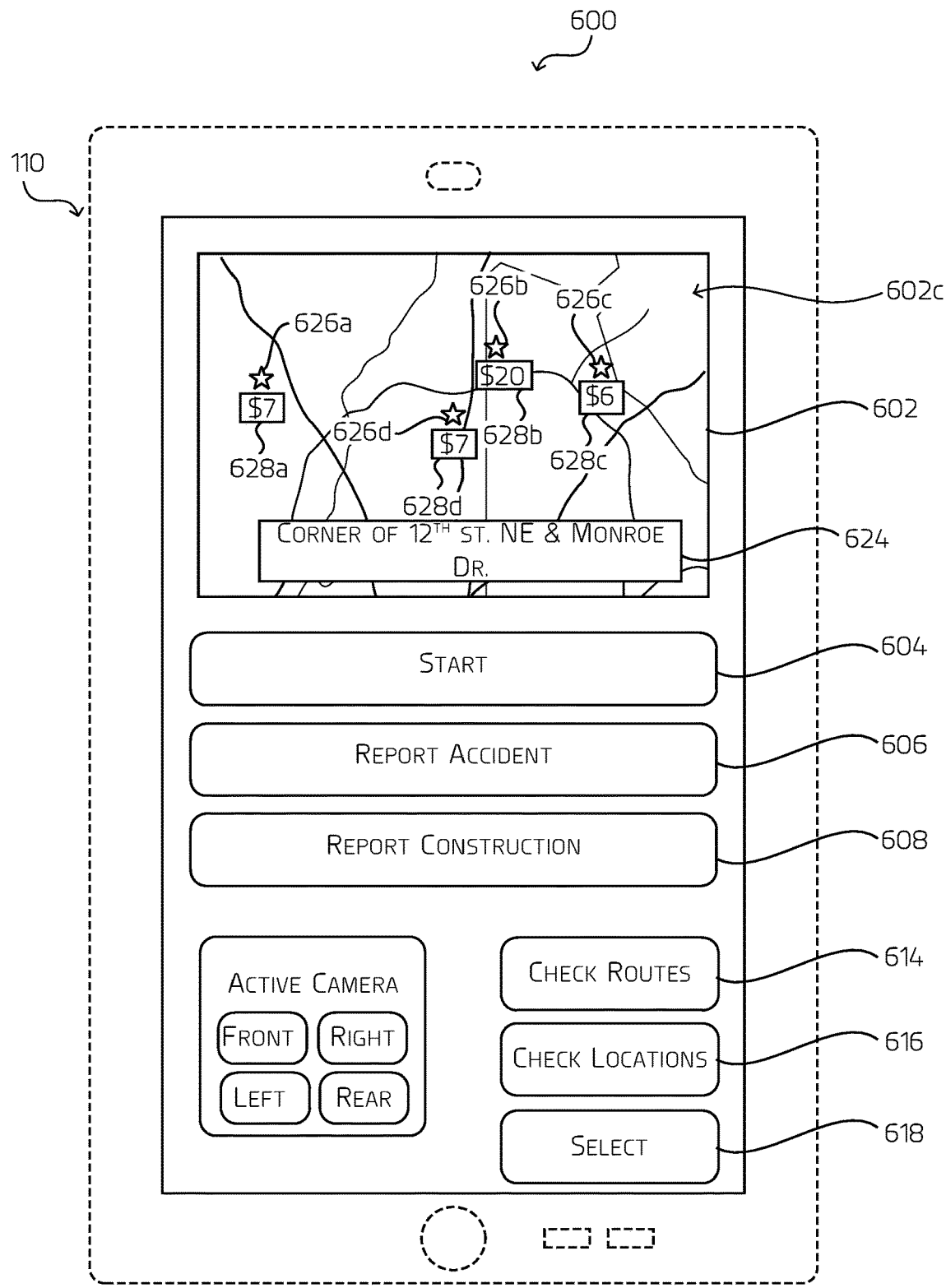

As shown in FIGS. 6A-6C, examples of the present disclosure can also comprise an app 110, including an interface for use with the system 100 and methods 500 discussed herein. As shown, in some examples, the UI 600 can comprise a graphical user interface (GUI). In other examples, however, the interface could comprise a voice interface, for example, to enable the user to receive instructions and provide feedback verbally. As discussed below, the user can also provide feedback via one or more controls (e.g., buttons, sliders, etc.), text messages, and other methods.

The UI 600 can be implemented on the screen, or display of a vehicle, or the user's electronic device (e.g., a cell phone or tablet). The UI 600 can include a display window 602, a start control 604, and one or more reporting controls 606, 608. The UI 600 can also include a camera control 610 and one or more check controls 614, 616.

In some configurations, the display window 602 can be used to display the camera view 602a—i.e., the current view of the camera(s) 420 on the electronic device 106. This can be useful to enable the user to select the proper viewpoint, for example, and to determine whether they are capturing the correct data (e.g., a difference 508) in the camera(s) 420 view. The user may change the camera view from a front view to a side view, for example, as they travel past an accident or construction site. As discussed below, the display window 602 can also be used to display mapping requests for routes or areas-of-interest.

The UI 600 can also comprise a start control 604. Due to bandwidth, battery, processor, and memory usage, among other things, users may wish to turn the app 110 on and off. Users may use the app 110 to make money during set hours, for example, but then turn the app 110 off for personal driving. Taxi, truck, and other professional drivers may wish to turn the app 110 off when on a delivery, for example, but then turn on the app 110 when returning from the delivery (i.e., "dead-heading" or "bob-tailing").

The UI 600 can also comprise a report accident control 606, a report construction control 608, and other reporting controls. As the name implies, this can enable the user to easily report differences 508 as they encounter them. This can also alert the global map server 102 to pay particular attention to the local map data 112 from the user. In some examples, upon activating a reporting control 606, 608, the app 110 may temporarily increase the frequency with which local map data 112 is sent to the global map server 102 (e.g., camera resolution or frame rate). In other examples, upon activating a reporting control 606, 608 the global map server 102 may start, or increase, the number of mapping requests to that area-of-interest or route.

The UI 600 can also include an activate camera control 610. This can enable the user to activate the camera(s) 420 separately from the app 110. This can enable the user to turn on the app 110, for example, but not activate the camera(s) 420 until a mapping request is received or selected. Thus, the user can check routes or areas-of-interest, discussed below, locate a desirable route, and then activate the camera(s) 420, if desired. In other examples, the camera(s) 420 can be automatically activated any time the app 110 is open, for example, or when the user accepts a mapping request.

The camera control 610 can also include one or more camera orientation controls 612. The camera orientation controls 612 can enable the user to designate which way the camera(s) 420 are facing with respect to the vehicle 108 and, for electronic devices 106 with multiple cameras 420, which camera(s) 420 to activate. This can enable the system 100 to set the proper frame rate and, in addition to, or instead of, magnetometer data, to know the orientation of the camera(s) 420 with respect the vehicle 108, among other things. If the electronic device 106 is mounted to the front windshield 202 or rear windshield, for example, then the user can select the front camera control 612a or the rear camera control 612d, respectively. If the camera(s) 420 are mounted on one of the side windows 302 of the vehicle 108, on the other hand, the user can select the right 612b or left 612c side controls.

In some examples, the electronic device 106 can be embedded in the vehicle 108 (e.g., a component of the vehicle 108) or connected to the vehicle 108. In this configuration, the electronic device 106 may utilize one or more forward-, side-, or rear-looking cameras 420. This can include parking cameras, for example, security cameras, cruise control cameras, or other vehicle 108 components.

As mentioned above, due to the different perspectives, the system 100 may change the frame rate, resolution, or other camera settings based on the camera orientation control 612 selected. If the user selects the front 612a or rear 612d camera controls, for example, the frame rate and/or resolution may be lower simply because the scene changes less quickly. Conversely, when the right 612b or left 612c camera controls are selected, the frame rate and/or resolution may be higher to capture the quickly changing scene.

In other examples, the system 100 may detect which way the camera(s) 420 are facing automatically and adjust the camera setting accordingly. The system 100 can determine the orientation of the camera(s) 420 by comparing successive images, for example. In other words, if visual elements in successive images overlap, but are offset to one side, then the camera(s) 420 are likely facing sideways. Similarly, if visual elements in successive images are the same, but become larger or smaller, then the camera(s) 420 are likely facing forward or backward, respectively (assuming the vehicle 108 is traveling forward). In other examples, the system 100 can use data from one or more sensors on the electronic device 106 (e.g., the accelerometer(s), compass(es), magnetometer(s), etc.) to determine the orientation of the camera(s) 420. In still other examples, some or all of the camera(s) 420 can capture images simultaneously.

As mentioned above, the system 100 can include an incentive system to encourage users to provide information relevant to the system 100. If the global map data 114 is used to guide a fleet of autonomous (or manned) taxies, for example, then routes from the airport to hotels, from hotels to convention centers, and from hotels to restaurants may be particularly relevant. If the system 100 is being used to guide autonomous (or manned) ambulances, on the other hand, then routes from major interstates to hospitals, between hospitals, and from hospitals to other treatment centers may be more relevant.

Regardless, to check which routes or areas-of-location need to be mapped, the user can select the check routes 614 or check locations 616 controls. As the name implies, the check routes control 614 enables the user to check routes in the area for which the system 100 needs updates maps (e.g., to confirm an difference 508). Routes can include, for example, routes between major destinations (e.g., from the airport to downtown), sections of highway (e.g., I-75 north from Exit 263 to 290), or combinations of roads and/or highways.

Similarly, the check locations control 616 can enable the user to receive specific locations, or areas-of-interest, that the system 100 wishes to map. Areas-of-interest can include more specific locations such as, for example, specific addresses, intersections, businesses, airports, hotels, convention centers, etc. As discussed below, once the user has reviewed the available routes and or locations, the user can select one or more routes or locations to map with the select control 618.

In some examples, the app 110 can automatically monitor the availability of nearby mapping requests, specific types of mapping requests (e.g., routes vs. areas-of-interest), routes of specific lengths or values, or other parameters and prompt the user to select or deny the mapping request. Thus, the app 110 may alert the user of any mapping requests within a predetermined distance (e.g., 10 blocks, ½ mile, 1 mile, etc.) from their current location, for example, or of any mapping requests over $20, or a combination thereof. In some examples, the user can set a default distance, value, type, or other parameter using the app 110 and then automatically receive mapping requests that are within the default parameters (e.g., within ½ mile and over $10).

As shown in FIG. 6B, in some examples, when the user selects the check routes control 614, the display window 602 can change from the current view (e.g., the camera view 602a) to the route view 602b. As shown, the route view 602b can display one or more route mapping requests 620 and a route value 622 for each route mapping request 620. So, Route A 620a is shown with a route value 622a of $35, for example, while Route B 620b is shown with a route value 622b of $15. As mentioned above, this can be based on the value of the route to the system 100, how busy the route is, how many differences 508 appear on the route, etc.

In some examples, the UI 600 can also provide an audio list of route mapping requests 620. In addition to, or instead of, the route view 602b, the UI 600 can read a list of route mapping requests 620 to the user and receive an oral selection. The UI 600 may assign a letter or number to each route mapping request 620, for example, and the user can simply reply, "Route 1," or similar.

In some examples, the user can select a particular route, e.g., Route A 620a, by touching the route on the touchscreen of the electronic device 106, for example, by entering a number or letter on the touchscreen or keyboard of the electronic device 106, or by providing a verbal command. In some examples, upon selecting a particular route mapping request 620, the route view 602b can provide a detail window 624 that provides additional information about the route mapping request 620. The detail window 624 may provide highway numbers, street names, exit numbers, GPS coordinates, or other parameters that provide the user with the necessary information to drive the desired route. The detail window 624 may display, for example, "I-75N from Exit 263 to Exit 268." In some examples, the UI 600 can read contents of the detail window 624 aloud. This can enable the user to concentrate on driving, among other things.

The route view 602b can enable the user to review all current route mapping requests 620 and then pick a route mapping request 620 based on its route value 622 or its proximity to the user's current position, the user's destination or home, or any other relevant factors. In some examples, the route view 602b can enable the user to zoom in and zoom out to locate different route mapping requests 620. Once the user has determined which, if any, of the route mapping requests 620 they would like to map, the user can press the select control 618, say the letter or number associated with the route mapping request 620, or otherwise indicate acceptance.

Pressing the select control 618 can send a message from the electronic device 106 to the global map server 102 that the user is en route to the selected route associated with the route mapping request 620. In some examples, the electronic device 106 may also send current position, direction, and/or velocity information for the vehicle 108 to enable the global map server 102 to estimate when the user will begin the route mapping request 620. In some examples, once the global map server 102 has received a predetermined number of users to map a particular route mapping request 620, the route mapping request 620 can be removed from the route view 602b for the remaining users. In this manner, the route view 602b can be updated dynamically to prevent excessive numbers of maps along a particular route mapping request 620.

The system 100 can use location information from the electronic device 106 to ensure that the user follows the route mapping request 620 and to determine when the user has completed the route mapping request 620. In some examples, the UI 600 can provide voice commands, similar to a GPS, to guide the user along the route. In some example, payment can be made to the user only when the user completes the entire route mapping request 620. In other examples, the user can be paid a pro-rated amount for completing part of a route mapping request 620. This can enable users to reroute when necessary due to detours, accidents, or other factors. If necessary, the route mapping request 620 can be pieced together with partial data from multiple users.

As shown in FIG. 6C, in some examples, a map of a particular area-of-interest, rather than an entire route mapping request 620 may be more useful. Thus, the system 100 can also include location mapping requests 626. This may be due to a difference 508 at a particular location (e.g., a construction site, hotel, intersection, or airport), for example, or because the user only has a certain amount of time or wants to stay in a particular area. In this case, the user can press the check locations control 616 or provide the appropriate voice command. In response, the display window 602 can change to a locations view 602c.

The locations view 602c can provide (visually or aurally) one or more location mapping requests 626a-d and a location value 628a-d (e.g., dollar or point values) for each. As before, certain location mapping requests 626 may be more important to the system 100 than others. As a result, certain location mapping requests 626 may have higher location values 628. Newly discovered differences 508, for example, may be assigned a higher value to ensure they are confirmed or denied in a timely manner. Known differences 508 that are being checked periodically to confirm they still exist, on the other hand, may be assigned lower location values 628. Similarly, location mapping requests 626 in busy areas (e.g., hotels and convention centers) may have higher location values 628 than location mapping requests 626 in more rural or residential location mapping requests 626.

As before, when the user selects a particular location mapping request 626a, by touching the appropriate place on the locations view 602c or providing the appropriate voice command, for example, the UI 600 can provide the detail window 624 with a specific area-of-interest. The detail window 624 can include, for example, an intersection, GPS coordinate, hotel, convention center, or address to enable the user to map the specific location desired. Again, the system 100 can determine when the user has reached the desired location based on GPS or cellular location coordinates, imaging data, or other suitable means.

The UI 600 can enable users to turn the app 110 and the camera(s) 420 on and off. The UI 600 can also enable the user to review and select route mapping requests 620 and location mapping requests 626 to map. In some examples, the UI 600 can also include accounting features to enable the user to review the money or points earned and to redeem money or points when desired. In some examples, the app 110 can also direct deposit funds, in real-time or in batches, into user accounts as they complete maps of route mapping requests 620 and location mapping requests 626.

Figure 7:
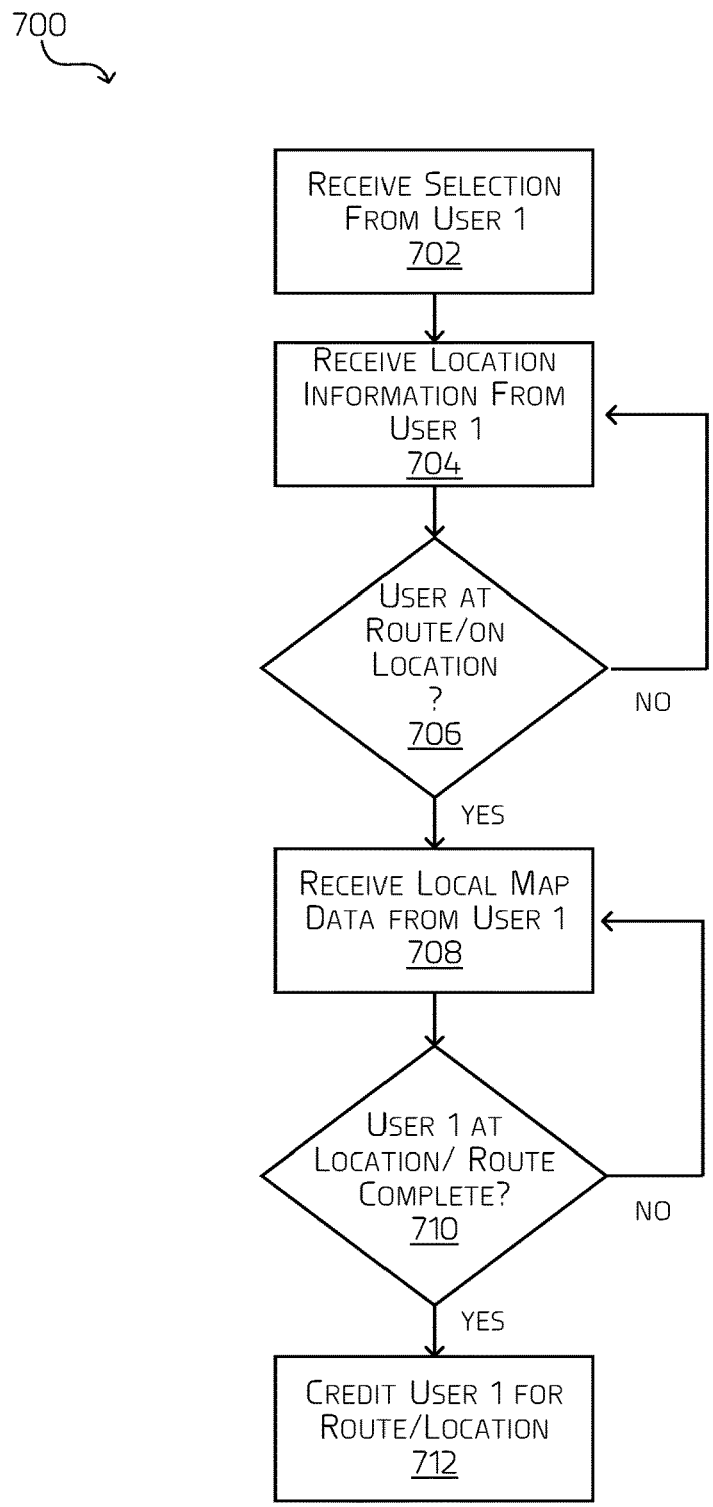
FIG. 7 is a flowchart depicting an example of a method to compensate users for mapping areas, in accordance with some examples of the present disclosure.

As shown in FIG. 7, examples of the present disclosure can also include a method 700 for monitoring and paying users to map routes and locations. At 702, the global map server 102 can receive an acknowledgement from a user, via the app 110, for example, that the user has accepted a route mapping request 620 or a location mapping request 626. As discussed above, this information can be provided to the global map server 102 when the user selects a route mapping request 620 in the UI 600. Of course, users could also make selections by using voice commands, accessing a website running the app 110, sending text messages or e-mails to the system 100, or other suitable means.

At 704, the global map server 102 can receive location information from the electronic device 106. As before, this can include GPS coordinates, for example, or cellular location services data from the electronic device 106. Of course, the user may select a route mapping request 620 or location mapping request 626 that is some distance away from the user's location. As a result, the method 700 can track the electronic device 106 periodically from the current location to the beginning of the route mapping request 620, for example, or to the location mapping request 626.

At 706, the global map server 102 can determine if the electronic device 106 has reached the beginning of the route mapping request 620 or the location mapping request 626. This can be accomplished by comparing the current position of the electronic device 106 with location information for the route mapping request 620 or location mapping request 626. In some examples, when the electronic device 106 is within a predetermined distance (e.g., 50 feet, 100 yards, or ½ mile) of the beginning of the route mapping request 620 or the location mapping request 626, the electronic device 106 can be determined to be at the location or the beginning of the route. Of course, in some examples, the electronic device 106 itself can determine that it is at the location or the beginning of the route and update the global map server 102 with this information.

At 708, when the electronic device 106 is determined to be at the location mapping request 626 or at the beginning of the route mapping request 620 (or within a predetermined distance)—either by the global map server 102, the app 110, or the electronic device 106—the electronic device 106 can start sending, and the global map server 102 can start receiving, the local map data 112. Thus, the electronic device 106 can determine its own location and start sensing local map data 112, for example; or, the global map server 114 can determine that the electronic device 106 is in the location and send a signal to begin sending the local map data 112.

The amount of local map data 112 can be based on whether a location mapping request 626 or a route mapping request 620 is being completed, among other things. The amount of local map data 112 can also be based on whether the user is mapping a location mapping request 626 or a route mapping request 620 is of high importance or low importance, a new location mapping request 626 or route mapping request 620—as opposed to confirming a location mapping request 626 or route mapping request 620—the angle of the camera(s) 420 and the speed of the vehicle 108, among other things. In some examples, the user may also confirm their location using the start control 604, for example, or providing some other input (e.g., a voice command).

If the user is mapping a route mapping request 620, for example, then the global map server 102 may collect local map data 112 periodically, or constantly, from the beginning of the route mapping request 620 to the end of the route mapping request 620. To ensure full coverage, the global map server 102 may begin collecting local map data 112 from the electronic device 106 at some predetermined distance before and after the route mapping request 620 (e.g., 100 or 500 yards). When mapping a location mapping request 626, on the other hand, local map data 112 may be collected for a shorter time or distance, simply because a smaller area needs to be mapped.

At 710, the global map server 102, the app 110, or the electronic device 106 can determine that the user has completed the map of the route mapping request 620 or location mapping request 626. As mentioned above, this may include some additional time or distance on either end of the route mapping request 620 or in proximity to the location mapping request 626 to ensure full coverage. In some examples, the app 110 may also prompt some input from the user via the UI 600 or a voice command—e.g., "Please press the select control or say, 'Done." to confirm you have completed the route."

At 712, the user can be credited for completing the route mapping request 620 or location mapping request 626. In some examples, this can require that the user map the entire route mapping request 620. In other examples, multiple users can map a route mapping request 620, for example, with each user completing part of the route mapping request 620 and being paid on a pro rata basis. As discussed above, each route mapping request 620 or location mapping request 626 can be assigned a value 622, 628 based on a number of factors. Users can then choose which route mapping requests 620 and location mapping requests 626 to map based on their proximity to the mapping requests 620, 626, the values 622, 628, traffic, and other factors.

FIGS. 5A-5C and 7 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described should not be construed as a limitation, and any number of the described blocks can be combined in any order and/or in parallel to implement the processes.

The systems 100, 600 and methods 500, 700 described above relate to verifying and updating high-resolution global map data 114 for use in navigation, automation, and other purposes. The systems 100, 600 and methods 500, 700 can locate differences 508 between high-resolution global map data 114 and local map data 112 from one or more electronic devices 106. These differences 508 can then be confirmed to ensure they are valid and the locations of the differences 508 can be sent to electronic devices 106 or mapping vehicles to remap the route or location. The systems 100, 600 and methods 500, 700 enable users to use their vehicles 108 and electronic devices 106 to earn money, while providing timely, crowd-sourced data to maintain the global map data 114 at reduced cost and with greater accuracy.

While several possible examples are disclosed above, examples of the present disclosure are not so limited. For instance, while systems and methods for updating global maps for use with autonomous taxies are discussed, for example, other vehicle, navigation, and delivery systems could also use such global maps without departing from the spirit of the disclosure. In addition, the location and configuration used for various features of examples of the present disclosure such as, for example, the order of steps, the components of the electronic device 106, app 110, or UI 600, and the locations of various components (e.g., handheld vs. vehicle embedded electronic devices 106) can be varied according to a particular electronic device 106, vehicle, computer network or other component that requires a slight variation due to, for example, the size or construction of the electronic device 106, the size of the screen, or the processing power of the electronic device 106 or global map server 102. Such changes are intended to be embraced within the scope of this disclosure.

The specific configurations and layouts of the UI 600, app 110, electronic device 106, and other features, and the size, location, and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of protection afforded by this application is indicated by the appended claims, rather than the foregoing description, and all variations that come within the meaning and range of equivalents thereof are intended to be embraced therein.

What is claimed is:

1. An electronic device comprising:
   one or more processors;
   a sensor; and
   memory storing computer-executable instructions that, when executed by the one or more processors, configure the electronic device to perform operations comprising:
   receiving a mapping request from a global map server for a first area, the mapping request associated with a discrepancy between global map data and second local data associated with the area provided by another electronic device;

causing presentation of a route view associated with the mapping request, the route view comprising at least one road between a first location and a second location and a route value associated with a completion of the mapping request;

capturing, using the sensor, first local data associated with the first area;

sending the first local data to the global map server; and receiving updated global map data from the global map server, the updated global map data being based at least in part on the first local data sent by the electronic device and the second local data.

2. The electronic device of claim 1, wherein:
the first local data includes at least one of first location data or first image data associated with the first area; and
the second local data includes at least one of second location data or second image data associated with the first area.

3. The electronic device of claim 1, the operations further comprising:
receiving input accepting the mapping request,
wherein capturing the first local data associated with the first area is based at least in part on receiving the input accepting the mapping request.

4. The electronic device of claim 1, further comprising a second sensor,
wherein the first local data comprises image data captured by the first sensor and location data captured by the second sensor.

5. The electronic device of claim 1, wherein the electronic device comprises at least one of a mobile device or a vehicle-based computer.

6. A method comprising:
receiving, at a first electronic device and from a global map server, a mapping request for an area, the area associated with a difference between global map data and sensor data received from another device, the mapping request comprising a route from a first location to a second location and a route value associated with a completion of the mapping request;
capturing, by the first electronic device, local data associated with the area;
sending, by the first electronic device, the local data to the global map server, the local data including at least one of location data or image data associated with the area; and
receiving, at the first electronic device, updated global map data from the global map server, the updated global map data being based at least in part on the local data sent by the first electronic device and additional local data associated with the area provided by a second electronic device.

7. The method of claim 6, wherein:
the local data includes at least one of first location data or first image data associated with the area; and
the additional local data includes at least one of second location data or second image data associated with the area.

8. The method of claim 6, wherein:
the area comprises a route from a first location to a second location; and
the capturing comprises capturing at least one of image data or location data at multiple locations along the route.

9. The method of claim 6, wherein the area is at least one of:
associated with at least at threshold amount of traffic;
associated with global map data that has not been updated for a threshold amount of time;
associated with global map data for which conflicting local data has been received.

10. The method of claim 6, wherein the mapping request for the area is received based at least in part on the first electronic device being within a threshold distance of the area.

11. The method of claim 6, wherein the first electronic device comprises at least one of a mobile device or a vehicle-based computer.

12. The method of claim 6, further comprising:
receiving, from the global map server, a credit associated with the first electronic device for completion of the mapping request of the area,
wherein a user is credited based on a value associated with the completion of the mapping request of the area.

13. One or more non-transitory computer storage media storing instructions which, when executed, by one or more processors, cause the one or more processors to perform:
receiving, at a first electronic device and from a global map server, a mapping request for an area, the mapping request associated with a discrepancy between global map data and second local data associated with the area provided by another electronic device;
causing presentation of a route view associated with the mapping request, the route view comprising at least one road between a first location and a second location and a route value associated with a completion of the mapping request;
capturing, by the first electronic device, local data associated with the area;
sending, by the first electronic device, the local data to the global map server, the local data including at least one of location data or image data associated with the area; and
receiving, at the first electronic device, updated global map data from the global map server, the updated global map data being based at least in part on the local data sent by the first electronic device and additional local data associated with the area provided by a second electronic device.

14. The one or more non-transitory computer storage media of claim 13, wherein:
the local data includes at least one of first location data or first image data associated with the area; and
the additional local data includes at least one of second location data or second image data associated with the area.

15. The one or more non-transitory computer storage media of claim 13, wherein:
the area comprises a route from a first location to a second location; and
the capturing comprises capturing at least one of image data or location data at multiple locations along the route.

16. The one or more non-transitory computer storage media of claim 13, wherein the area is at least one of:
associated with at least at threshold amount of traffic;
associated with global map data that has not been updated for a threshold amount of time;
associated with global map data for which conflicting local data has been received.

17. The one or more non-transitory computer storage media of claim 13, wherein the mapping request for the area is received based at least in part on the first electronic device being within a threshold distance of the area.

18. The one or more non-transitory computer storage media of claim 13, further comprising:
receiving, from the global map server, a credit associated with the first electronic device for completion of the mapping request of the area,
wherein a user is credited based on the value associated with the completion of the mapping request of the area.

* * * * *